US010741032B2

(12) United States Patent
Robertson et al.

(10) Patent No.: US 10,741,032 B2
(45) Date of Patent: *Aug. 11, 2020

(54) METHOD FOR COLLECTING AND SHARING LIVE VIDEO FEEDS OF EMPLOYEES WITHIN A DISTRIBUTED WORKFORCE

(71) Applicant: BroadPath, Inc., Tucson, AZ (US)

(72) Inventors: Jerry Daron Robertson, Tucson, AZ (US); Donald Gerard Hubman, Tucson, AZ (US); Kristen Olivia Dell, Tucson, AZ (US); Robert Yadao Imperio, Tucson, AZ (US)

(73) Assignee: BroadPath, Inc., Tucson, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/410,937

(22) Filed: May 13, 2019

(65) Prior Publication Data
US 2019/0266864 A1  Aug. 29, 2019

Related U.S. Application Data

(63) Continuation of application No. 15/629,462, filed on Jun. 21, 2017, now Pat. No. 10,339,775.

(60) Provisional application No. 62/353,009, filed on Jun. 21, 2016.

(51) Int. Cl.
G08B 13/196 (2006.01)
G06K 9/00 (2006.01)
G06Q 10/10 (2012.01)
H04N 7/18 (2006.01)

(52) U.S. Cl.
CPC ..... *G08B 13/19645* (2013.01); *G06K 9/00369* (2013.01); *G06Q 10/1091* (2013.01); *H04N 7/181* (2013.01); *G06K 9/00771* (2013.01); *G06T 2207/30232* (2013.01)

(58) Field of Classification Search
CPC ......... G08B 13/19645; G06K 9/00369; G06K 9/00771; G06Q 10/1091; H04N 7/181; G06T 2207/30232; G06G 10/1091
See application file for complete search history.

(56) References Cited

U.S. PATENT DOCUMENTS

2013/0063542 A1\* 3/2013 Bhat ................. H04N 7/15
348/14.03

\* cited by examiner

*Primary Examiner* — Michael E Teitelbaum
(74) *Attorney, Agent, or Firm* — Run8 Patent Group, LLC; Leah Raddatz; Peter Miller

(57) ABSTRACT

One variation of a method for collecting and sharing substantially real-time video feeds of employees within a distributed workforce includes: distributing a first subset of employee video feeds to a first instance of an employee portal; distributing a second subset of employee video feeds to a second instance of the employee portal; distributing the manager video feed to the first instance and the second instance of the employee portal; distributing the set of employee video feeds to an instance of the manager portal; in response to initiation of a recess for the first employee: replacing the first employee video feed with a recess icon in the second instance of the employee portal and the instance of the manager portal; initiating a timer for the recess; and in response to expiration of the timer, reactivating the first employee video feed.

19 Claims, 9 Drawing Sheets

S100

| EMPLOYEE EXPERIENCE | | |
|---|---|---|
| TIME IN CURRENT POSITION (MO) | RANK | EMPLOYEE |
| 25 MONTHS | 1 | RYAN |
| 22 MONTHS | 2 | LISA |
| 21 MONTHS | 3 | SARAH |
| 18 MONTHS | 4 | MATT |
| 12 MONTHS | 5 | ALI |
| 10 MONTHS | 6 | ELIZABETH |
| 3 MONTHS | 7 | TOM |
| 1 MONTHS | 8 | JILL |
| 0 MONTHS | 9 | BAILEY |

| WORK OUTPUT | | AVE. CUSTOMER FEEDBACK RATING | |
|---|---|---|---|
| # OF CALLS TODAY | EMPLOYEE | | RANK |
| 15 | RYAN | 4.7 | 1 |
| 14 | SARAH | 4.7 | 2 |
| 13 | MATT | 4.8 | 3 |
| 13 | LISA | 4.6 | 4 |
| 13 | JILL | 4.5 | 5 |
| 12 | TOM | 4.6 | 6 |
| 10 | ALI | 4.5 | 7 |
| 8 | BAILEY | 4.1 | 8 |
| 7 | ELIZABETH | 4.2 | 9 |

| FEED SELECTION FREQUENCY | | |
|---|---|---|
| RANK | # OF TIMES FEED SELECTED OVER 30 DAYS | EMPLOYEE |
| 1 | 30 | JILL |
| 2 | 25 | BAILEY |
| 3 | 22 | ALI |
| 4 | 16 | RYAN |
| 5 | 10 | SARAH |
| 6 | 7 | LISA |
| 7 | 7 | TOM |
| 8 | 5 | ELIZABETH |
| 9 | 2 | MATT |

MANAGER PORTAL — MANAGER

SORT FEEDS BY ✓
- EXPERIENCE
- FEED SELECTION FREQUENCY
- AVE. CUSTOMER RATING
✓ # OF CALLS TODAY
- WORK OUTPUT
- RECESS TIMER EXPIRATION

ASC. vs DESC
✓ ASC.
- DESC.

1 RECESS ELIZABETH　2 BAILEY　3 ALI　4 LUNCH TOM　5 JILL
6 LUNCH LISA　7 MATT　8 SARAH　9 RYAN

METHOD FOR COLLECTING AND SHARING LIVE VIDEO FEEDS OF EMPLOYEES WITHIN A DISTRIBUTED WORKFORCE

CROSS-REFERENCE TO RELATED APPLICATIONS

This Application is a continuation of U.S. patent application Ser. No. 15/629,462, filed on 21 Jun. 2017, which claims the benefit of U.S. Provisional Application No. 62/353,009, filed on 21 Jun. 2016, each of which is incorporated in its entirety by this reference.

TECHNICAL FIELD

This invention relates generally to the field of telecommunications and more specifically to a new and useful method for collecting and sharing real-time video feeds of employees within a distributed workforce in the field of telecommunications.

BRIEF DESCRIPTION OF THE FIGURES

FIG. 8 is a flowchart representation of the method.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

As shown in FIGS. 1-5, a method S100 for collecting and sharing substantially real-time video feeds of employees within a distributed workforce includes: accessing a set of employee video feeds from a set of cameras coupled to employee computing devices executing instances of an employee portal in Block S112; accessing a manager video feed from a manager camera coupled to a manager computing device executing an instance of a manager portal in Block S114; distributing a first subset of employee video feeds to a first instance of the employee portal executing on a first employee computing device associated with a first employee, the first subset of employee video feeds including a second employee video feed of a second employee and a third employee video feed of a third employee in Block S121; distributing a second subset of employee video feeds to a second instance of the employee portal executing on a second employee computing device associated with a second employee, the second subset of employee video feeds including a first employee video feed of the first employee and the third employee video feed of the third employee in Block S122; distributing the manager video feed to the first instance of the employee portal and the second instance of the employee portal in Block S123; distributing the set of employee video feeds to the instance of the manager portal in Block S124; in response to initiation of a recess for the first employee: disabling the first employee video feed of the first employee in Block S130; replacing the first employee video feed with a recess icon in the second instance of the employee portal and the instance of the manager portal in Block S140; initiating a timer for the recess based on a type of the recess in Block S150; and in response to expiration of the timer, reactivating the first employee video feed in the second instance of the employee portal and the instance of the manager portal in Block S160.

Figure 1:
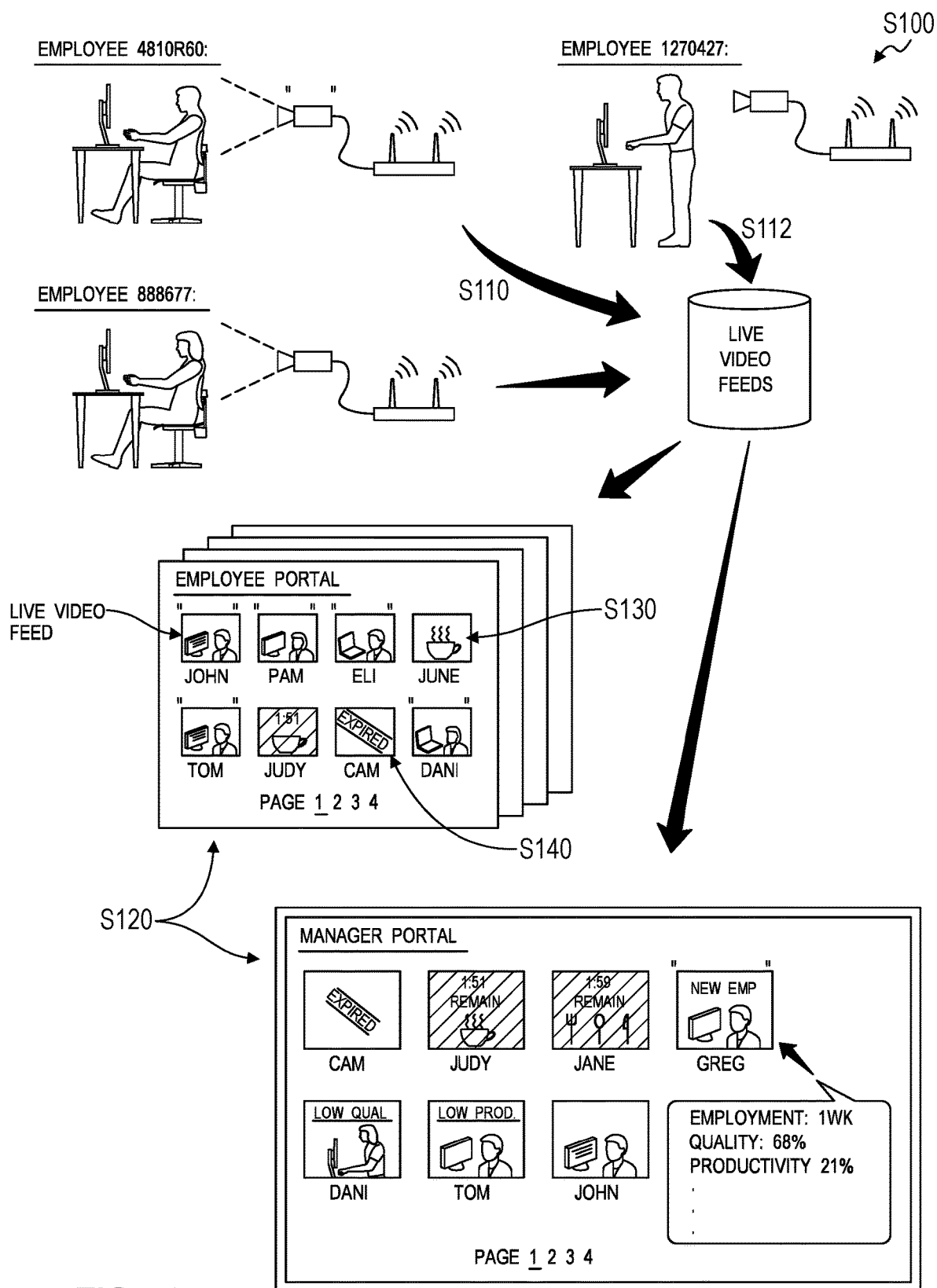
FIG. 1 is a flowchart representation of a method.
Figure 2:
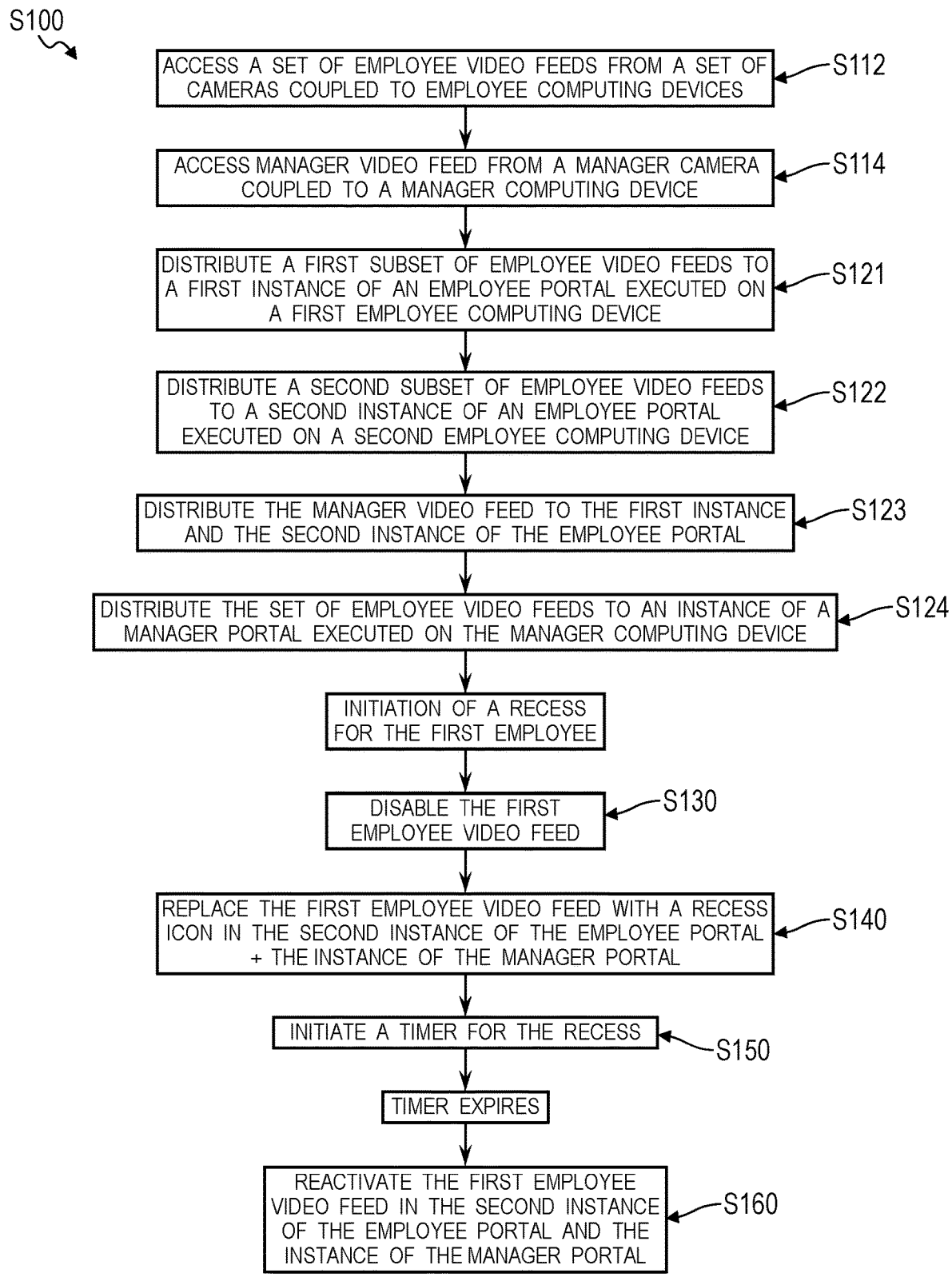
FIG. 2 is a flowchart representation of the method.

One variation of the method S100, as shown in FIGS. 1 and 2, includes accessing a set of employee video feeds from employee computing devices executing instances of an employee portal; accessing a manager video feed from a manager computing device executing an instance of a manager portal; during a working period, distributing a first subset of employee video feeds and the manager video feed to a first instance of the employee portal executing on a first employee computing device associated with the first employee, the first subset of employee video feeds selected from the set of employee video feeds; distributing the subset of employee video feeds to the instance of the manager portal; receiving a selection of employee video feeds, from the subset of employee video feeds, at the first instance of the employee portal; in response to initiation of a recess by the first employee: replacing the first employee video feed with a first recess icon in instances of the employee portal in which the first employee video feed is active and in the instance of the manager portal; initiating a first timer for the recess based on a type of the recess; and distributing the selection of employee video feeds to the first instance of the employee portal; in response to expiration of the first timer: reactivating the first employee video feed in instances of the employee portal in which the first employee video feed is active and in the instance of the manager portal; and replacing the selection of employee video feeds with the first subset of employee video feeds in the first instance of the employee portal.

2. Applications

Generally, the method S100 functions to serve video feeds of employees at work and alerts to managers and employees within a distributed workforce via manager and employee portals. The method S100 can also be implemented to serve employee video feeds to representatives of clients for which a distributed workforce is contracted to perform a service. By providing video feeds of employees within a distributed workforce to employees, managers, and/or client representatives, the computer system can enable employees to grow and maintain a sense of community and camaraderie despite working remotely from one another, can enable managers to control and monitor the distributed workforce, and can provide a client with more transparency into a company and its workforce during execution of a contract. Furthermore, by allowing the employees within the distributed workforce privacy during personal time through recess controls and providing accountability during working periods through peer-to-peer monitoring, the computer system can distribute video feeds to employee portals and manager portals to facilitate transparency and communication among employees and managers. Thus, the computer system can implement method S100 to encourage employee productivity and engagement without the manager micromanaging employees in the distributed workforce.

2.1 Applications: Employees

Within a distributed workforce in which employees (or contractors, etc.) "hotel," "work from home," or otherwise regularly work from remote locations, a computer system executing the method S100 can collect video feeds from cameras arranged in each employee's remote office (e.g., a hotel room or a home office) and serve forms of these video feeds to other employees within the workforce via corresponding employee portals. For example, a computer system executing Blocks of the method S100 can simultaneously serve live video feeds of each other employee within a set of employees to each employee portal associated with an employee within the set of employees, and each employee portal—executing on an employee's computing device—can render these video feeds simultaneously in a rectilinear grid array of video feed tiles for quick and convenient visual consumption by these employees. Similarly, the computer system can serve video feeds of each employee supervised by a manager to a manager portal, and the manager portal can simultaneously render video feeds of all employees under the manager's supervision in a rectilinear grid array of video feed tiles for quick and convenient visual consumption by the manager. An employee within the workforce can thus observe other employees within her company in real-time through her employee portal. The computer system can also support internal communications between employees, such as via text-based messaging, two-way audio communications, or a video call, through employee portals. By thus enabling employees within a distributed workforce to view other employees in real-time and to communicate with other employees through their employee portals, the computer system can enable employees within the distributed workforce to grow and maintain a sense of community. Furthermore, because employees within the distributed workforce can view each other and communicate with each other in real-time, the computer system can affect a sense of accountability among these employees.

Generally, as shown in FIG. 2, the computer system can implement method S100 to collect and distribute video feeds of employees to employee portals, thereby enabling employees within a distributed workforce to see one another while working, communicate with one another, and develop a sense of camaraderie while working together over time despite being physically remote from other employees in the workforce. The computer system can execute method S100 to facilitate two-way visibility and communication between employees during working periods and during recess periods (e.g., lunch breaks) through employee portals that render video feeds of other employees. The computer system can also function to improve employee bonding with other (remote) employees by receiving and distributing employee selections of video feeds, thereby enabling employees to curate video feeds of other employees rendered in their employee portals.

Figure 4:
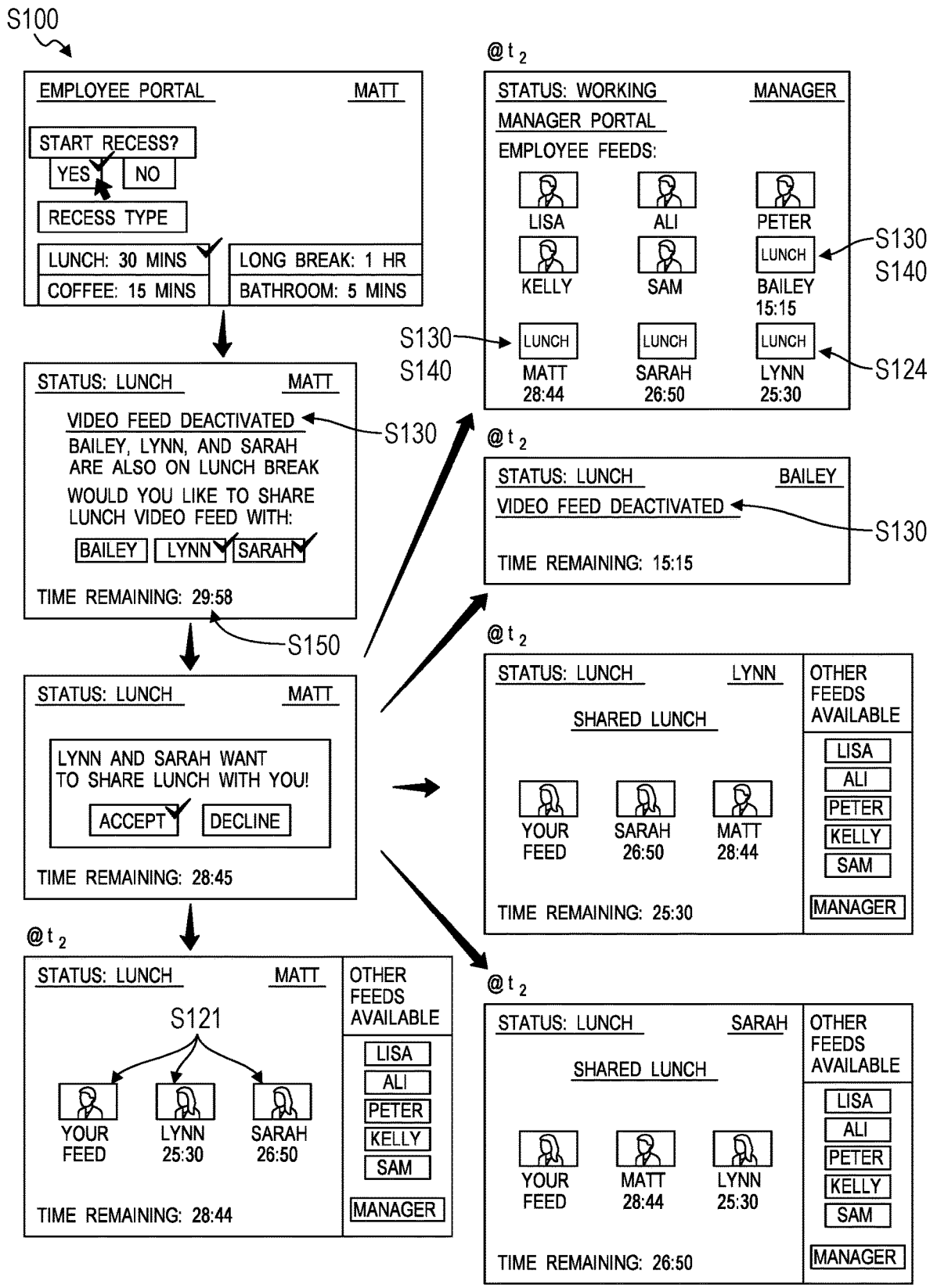
FIG. 4 is a flowchart representation of the method.

For example, the computer system can receive an input through a first instance of the employee portal from a first employee indicating that she wishes to view video feeds of her associates (e.g., friends)—including a second employee and a third employee remote from the first employee—in the first instance of the employee portal while the first employee works. Thus, the computer system can distribute a second video feed of the second employee and a third video feed of the third employee to the first instance of the employee portal—rendered on the first employee's computing device—to facilitate a sense of community and companionship between the first, second, and third employees during working periods. Similarly, as shown in FIG. 4, the computer system can receive an input through the first instance of the employee portal from the first employee indicating that she wishes to share her video feed during her recess (e.g., a lunch break) with the second employee and the third employee. The computer system can also receive inputs through a second employee portal and a third employee portal indicating that the second employee and the third employee wish to share video feeds with the first employee during a recess period shared among the first employee, the second employee, and the third employee. Thus, the computer system can distribute the first video feed, the second video feed, and the third video feed to the first instance of the employee portal, the second employee portal, and the third employee portal during the recess period, thereby enabling the first employee, the second employee, and the third employee to share the recess period and facilitate camaraderie between employees during personal time despite the first, second, and third employees working remotely from one another.

Furthermore, the computer system can execute Blocks of method S100 to serve manager video feeds to employee portals to facilitate transparency between managers and employees. For example, the computer system can implement Blocks of the method S100 to distribute video feeds of managers to employee portals and video feeds of employees to manager portals, thereby enabling managers to remotely monitor employees while also reducing employee perception of manager surveillance and micromanaging by enabling employees to similarly monitor their managers. Prolonged one-way video surveillance and censorship of an employee by a manager may lead to employee mistrust and resentment of management, may make an employee less receptive to feedback from managers, may hinder employee engagement and job satisfaction, and may result in reduced work output and reduced work quality from employees. In particular, one-way video surveillance, in which a manager may view an employee but the employee may not see the manager, may make an employee feel scrutinized, imply manager mistrust of the employee's work, and accentuate hierarchic disparities between the manager and the employee. To avoid prolonged one-way video surveillance of the employee by the manager, the computer system can host two-way video feeds between the employee and manager(s) to enable the employee to view the manager(s) and the manager(s) to view the employee during work periods, thereby improving transparency between the employee and the manager(s). Thus, the computer system can implement two-way video feeds, which may lessen employee perception of hierarchic disparities and improve employee satisfaction during working periods.

Additionally, the computer system can also implement the method S100 to distribute employee video feeds to employee portals, thereby enabling employees in a set of employees (e.g., a team within a distributed workforce) to monitor other employees in the set of employees during working periods. Generally, the computer system can implement Blocks of the method S100 to improve employee accountability through peer-to-peer monitoring during work hours while maintaining employee privacy during personal time, such as during a work recess. The computer system can implement method S100 to facilitate peer-to-peer monitoring by distributing employee video feeds—depicting employees at work—to employee portals, thereby enabling remote employees to see what another employee is working on through an instance of the employee portal. Additionally, the computer system can distribute employee recess information—such as a recess timer—to employee portals such that employees in the distributed workforce may: quickly visually determine when other employees are taking breaks from work; quickly visually access remaining break times for these employees; and remind an employee to return to her computing device before a manager is alerted if the employee has exceeded her allotted break time (i.e., after expiration of a recess timer). Thus, the computer system can implement method S100 to improve employee-to-employee management through open communication channels between employees, thereby limiting manager micromanaging and perpetual surveillance of employees.

The computer system also can execute Blocks of method S100 to serve video feeds of employees and managers to employee portals and manager portals during working periods and disabling video feeds (e.g., at an employee computing device) during employee and manager personal time (i.e., break periods). Thus, the computer system can implement the method S100 to improve a sense of autonomy and privacy among employees by providing employees freedom over their personal time and their personal space during recess periods while maintaining a manager's confidence in the employee's work, productivity, and efficiency through selective distribution of video feeds of employees and managers to instances of the employee and manager portals during working periods. For example, the computer system can receive an input from an employee to initiate a (work) recess, such as a coffee break. During the recess, an employee may perform non-work related activities, such as drinking coffee and calling an associate, and the computer system can deactivate screen sharing and a camera coupled to the employee computing device in order to disable a video feed of the employee distributed to other employee portals and the manager portal.

As an employee's work quality improves, the employee may earn increased privacy during working periods. Thus, in response to detecting or receiving confirmation of an improvement in a first employee's work quality, productivity, etc., the computer system can decrease resolution of the first employee's video feed, deprioritize the first employee's video feed in a manager portal, deactivate the first employee's video feed altogether, and/or disable a screenshare feed of the first employee's display such that a manager may not elect to view the first employee's screenshare feed through the manager portal, etc. Thus, the computer system can implement the method S100 to enable merit-based employee autonomy. Furthermore, as described below, the computer system can improve manager efficiency by emphasizing—in the manager portal—employee video feeds of those employees with low work quality, low work output, and/or less training. Thus, the computer system can enable a manager to focus on and help employees who need assistance while also providing autonomy to employees who have demonstrated competence. By facilitating increased employee autonomy, the computer system can function to improve employee self-esteem and creative confidence, which may lead to boosts in employee engagement with their work and their productivity.

However, the computer system can implement any other process or schema according to the method S100 to improve employee morale, confidence and trust in management, engagement during work periods, accountability, and autonomy.

2.2 Applications: Managers

The computer system executing the method S100 can similarly serve employee video feeds to a manager through a manager portal in order to enable the manager to track, control, and manage the distributed workforce. For example, by serving video feeds of employees to the manager portal, the computer system can enable the manager (and other employees) to quickly and efficiently visually identify—in (near) real-time—an employee's actions and activities, whether and how well the employee is working, whether the employee requires assistance, etc. The computer system can also support internal communications between the manager and the employee via the manager and employee portals and can thus enable the manager to intervene promptly on behalf of an employee directly through her manager portal.

Generally, by serving employee video feeds to a manager through the manager portal, the computer system can enable the manager to efficiently monitor employees in the distributed workforce in real-time without necessitating check-ins with employees to discern employee productivity. Thus, the computer system can implement the method S100 to improve manager efficiency and efficacy in monitoring employees while deterring manager micromanagement of employees in the distributed workforce by supplying constant and consistent cursory visual access to employees during employee work periods.

For example, the computer system can receive an input from an employee to initiate a recess and automatically disable a video feed of the employee in other instances of the employee portal and the manager portal. The computer system can display: a recess timer in the manager portal for the duration of the employee's recess; a time at which the employee plans to return from the recess; and/or if the employee has failed to return from the recess after expiration of the recess timer. The computer system can also replace the video feed with a static image depicting the type of the recess, such as an image of a coffee mug to indicate a coffee break, in the manager and employee portals. Therefore, the computer system can implement the method S100 to provide privacy to the employee during the employee's personal time (i.e., a recess) by clearly indicating to the manager information about the employee's recess while also withholding a live video feed of the employee or the employee's office in order to prevent the manager from tracking the employee during her recess, which may otherwise interrupt and/or interfere with the employee's privacy during her recess.

Figure 9:
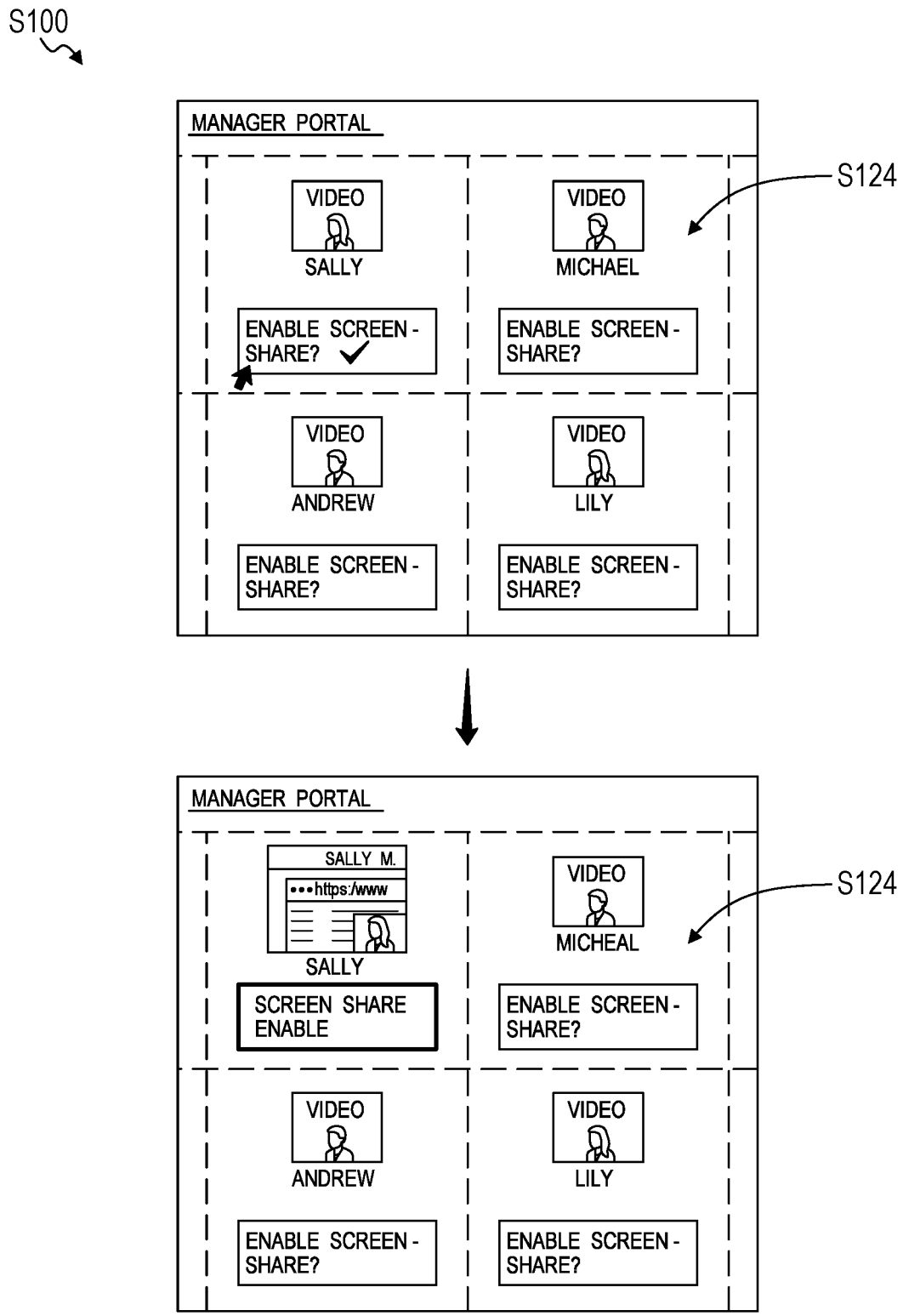
FIG. 9 is a flowchart representation of the method.

Additionally, the computer system can serve video feeds of employees in a distributed workforce to the manager through the manager portal to ensure employees are working and behaving according to corporate protocols. For example, during a working period, a first employee may gain access to private customer information, such as credit card information and private health information of a customer, through the first employee's computing device. The first employee may attempt to copy the private customer information for personal and/or illicit use. However, because the computer system distributes video feeds of the first employee working at the first employee's computing device to the manager through the manager portal in (near) real-time, the manager may view the first employee copying private customer information through the manager portal. In this example, as shown in FIG. 9, the manager, in response to viewing the employee acting suspiciously, may elect to view a screenshare feed of the first employee's computer screen in addition to the video feed of the first employee. Thus, the computer system can also distribute a screenshare feed of the first employee's computer screen to the manager feed in addition to the video feed of the first employee, such as when requested by the manager. The computer system can enable a manager to efficiently monitor employee activity and elect visual access to more comprehensive real-time data about employees and employee activities as requested by the manager. Thus, the computer system can implement the method S100 to improve visibility of employee worktime activities through live video and screenshare feeds distributed to the manager portal.

The computer system can also implement the method S100 to expedite employee training and enable managers to more efficiently support employees in need of assistance. By distributing (substantially) real-time video feeds of employees, the computer system can enable a manager to view—through an employee video feed in the manager portal—when an employee requires assistance and how to best aid the employee. For example, the computer system can order employee video feeds in the manager portal, such that employee video feeds of those employees with less training appear near a top of the manager portal and employee video feeds of those employees with more training appear near a bottom of or are hidden in the manager portal. Thus, a manager may track employees with less training more closely than employees with more training. Similarly, the computer system can also implement the method S100 to reduce frequency of manager check-ins with employees to ensure employees are working effectively due to constant and consistent cursory visibility of employee activity through employee video feeds in the manager portal throughout employee work periods.

Additionally, the computer system can distribute video feeds of multiple managers to employee portals. Thus, when a first manager of a first subset of employees steps away from a first manager computer device, employees in the first subset of employees may have access to other managers, who may be able to provide assistance, through the employee portal. For example, a first employee of a distributed call center may have a question about how to assist a customer, whom the first employee is assisting in a telephone conversation. In this example, the computer system can distribute an icon in place of a manager video feed to an employee portal viewed by the first employee to indicate that a primary manager of the first employee is on recess and may be unable to immediately assist the employee. However, the computer system can indicate that a second manager is available to help the first employee by rendering a video feed of the second manager in the first instance of the employee portal, such as adjacent or in place of the first primary manager's video feed. Furthermore, the computer system can transmit textual communications between the employee portal and the second manager portal such that the first employee may contact the second manager and the second manager may assist the first employee directly through the employee and manager portals.

However, the computer system can implement the method S100 in any other way to improve manager efficiency and efficacy in managing, monitoring, and training employees in a distributed (or local) workforce.

2.3 Applications: Clients

Furthermore, the computer system executing the method S100 can host a client portal accessible by a client of the company and can serve (live or delayed) video feeds of employees and managers within the workforce contracted by the client to the client portal. The computer system can thus provide the client real-time remote visual access to a state of the workforce. For example, rather than send an auditor to a corporate office employing local employees or to multiple private offices within a distributed workforce, an auditor can access the client portal to view employees remotely and to access various production-related data for these employees of the company contracted by the client. In particular, the computer system can leverage employee video feeds already collected for inter-employee accountability and for employee tracking within a company, as described above, to improve transparency of a contracted operation for a client of the company.

In particular, the computer system can execute Blocks of the method S100 to enable a client to monitor or audit both employee and manager productivity and ensure corporate resources are employed effectively and appropriately. Furthermore, the computer system can implement the method S100 to track and/or record employee and manager behavior securely while protecting private information of employees and managers in the distributed workforce and of customers, whose private information may be accessed by employees and managers in service of the client through instances of the employee and manager portals. For example, a client, such as a health insurance provider, may employ a distributed workforce to field support calls from customers filing insurance claims. In order to secure protected health information (hereinafter "PHI") and comply with regulations governing handling of PHI (e.g., ISO certifications), the computer system can configure employee and manager video feeds to limit replication of PHI content from employee and manager video feeds. For example, the computer system can define a maximum resolution of the video feeds: sufficient to obfuscate textual information rendered on a screen of an employee computing device captured in an employee video feed; and sufficient to distinguish employee activity through the employee video feed. Alternatively, an instance of the employee portal can insert an opaque mask over a region of an employee's video feed to obscure textual or graphical PHI content rendered on a screen of the employee's computing device to similarly protect such PHI content before uploading the employee's video feed to the computer system.

However, the computer system can implement any other method or technique to distribute employee and manager video feeds characterized by a resolution sufficient to enable other employees and managers to confirm that these employees and managers are working during a work period but insufficient to enable duplication of textual information—rendered on screens of employee and manager computing devices—captured in these video feeds.

A computer system executing the method S100 can thus support a sense of community and accountability within a distributed workforce while also enabling managers to track and monitor employees within the distributed workforce and enabling clients to remotely view and monitor employees within a company contracted by the client. For example, the method S100 can be executed to host employee, manager, and client portals within an insurance claim processing unit, within a call center, or within an insurance appeals processing unit employing a distributed workforce in order to achieve a sense of community and accountability among employees working remotely while also enabling managers and clients to track and monitor these employees. However, Blocks of the method S100 can be implemented in any other way to distribute live video feeds among employees within a remote and/or local workforce.

3. Computer System and Cameras

The method S100 is described herein as executed by a computer system, such as a cloud-based computer, a mainframe computer system, a grid-computer system, or any other suitable computer system in the form of a remote server. The computer system can interface with multiple manager computing devices and employee computing devices over a computer network (e.g., the Internet) to form a network of employee and manager computing devices. The network of employee and manager computing devices can also interface with a server (remote or local) to store video feeds or subsets of video feeds distributed across the network of employee and manager computing devices.

The computer system can interface with a digital camera—arranged within an employee's office or a manager's office—over a computer network (e.g., the Internet) to collect a (real-time or live) employee video feed of the employee working remotely. For example, an employee within a distributed workforce can be provided a digital camera including a discrete webcam, and the employee can manually position her webcam within her private office, such that the employee's computer monitor, desk, and task chair fall within the field of view of the camera. Once the webcam is connected to an internal router or to the employee's computer, the computer system can collect a video feed from the webcam. Alternatively, the computer system can interface with a camera integrated into the employee's (or manager's) computing device, such as a forward-facing camera integrated into the employee's laptop computer or into the employee's computer monitor.

In one implementation in which employees within a company handle private or sensitive information, an employee can be assigned a camera exhibiting a maximum resolution insufficient to enable a human or computer system to resolve sensitive information—displayed on a monitor within the employee's office—from frames recorded by the camera given a specified installation distance between the camera and the monitor and given typical employee viewing conditions for such content.

As described below, the computer system can serve employee video feeds (and other related employee data) to employees via instances of an employee portal, to a manager via a manager portal, and/or to a client representative via a client portal. Additionally, the computer system can serve manager video feeds to employees via instances of an employee portal and/or to a client via a client portal. For example, an employee can access an instance of the employee portal through a web browser or through a dedicated application executing on an Internet-connected computing device (e.g., a desktop computer, a laptop computer, a smartphone, or a tablet computer). A manager and a client representative may similarly access a manager portal and a client portal, respectively, through a web browser or dedicated application executing on corresponding manager and client computing devices.

4. Video Feeds

Block S112 of the method S100 recites accessing a set of employee video feeds from a set of cameras coupled to employee computing devices executing instances of an employee portal; and Block S114 recites accessing a manager video feed from a manager camera coupled to a manager computing device executing an instance of a manager portal. Generally, in Blocks S112 and S114, the computer system can access video feeds from cameras arranged within private offices of employees within a company's distributed workforce. For example, a camera assigned to an employee (i.e., coupled to a computing device of the employee) can capture and upload a continuous live video feed to the computer system via an Internet connection during work hours. Furthermore, the computer system can simultaneously collect video feeds from cameras assigned to multiple employees within a company or within a group (or set of employees) within a company.

The computer system can define an optimal field of view of a camera associated with an employee computing device, the optimal field of view of the camera encompassing a monitor (or display) of the employee computing device, a portion of a body of the employee, etc. For example, an employee may setup a camera in a private home office. The computer system can implement the method S100 to guide placement and orientation of the camera in the home office to capture an employee's monitor and a head of the employee in the employee video feed collected by the camera.

5. Portals

Figure 6:
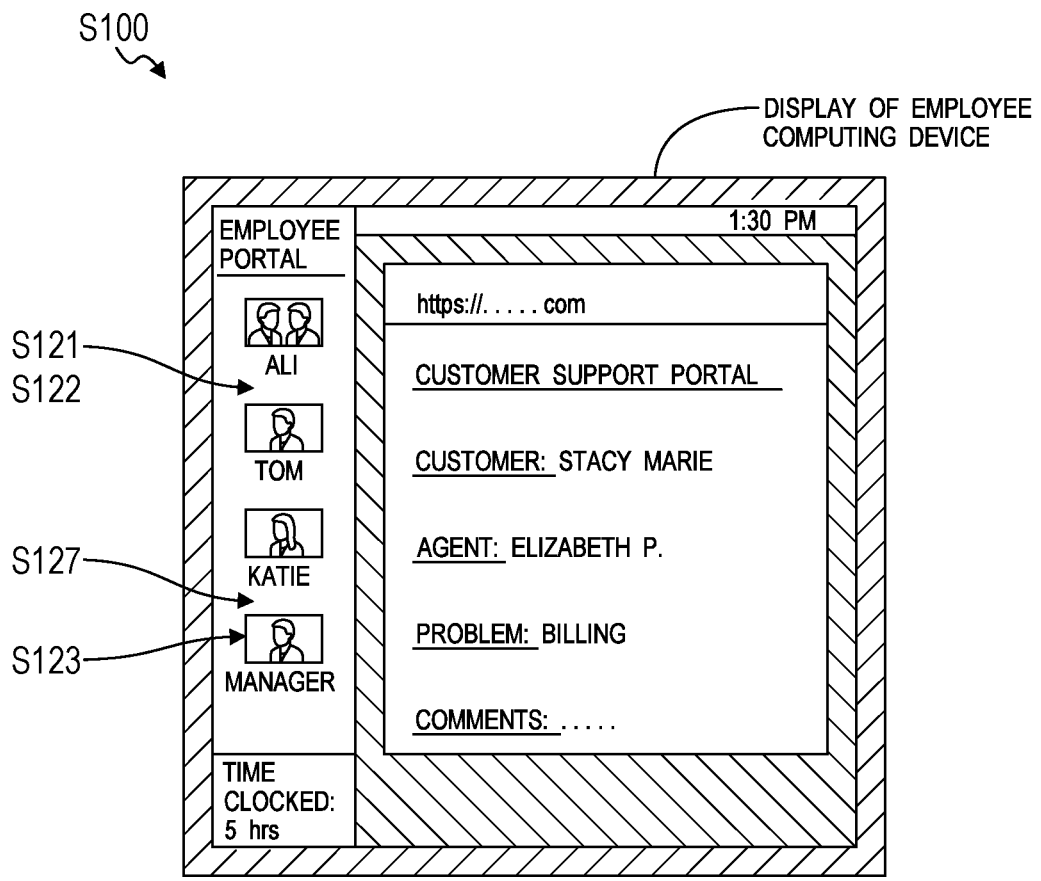
FIG. 6 is a schematic representation of the method.
Figure 7:
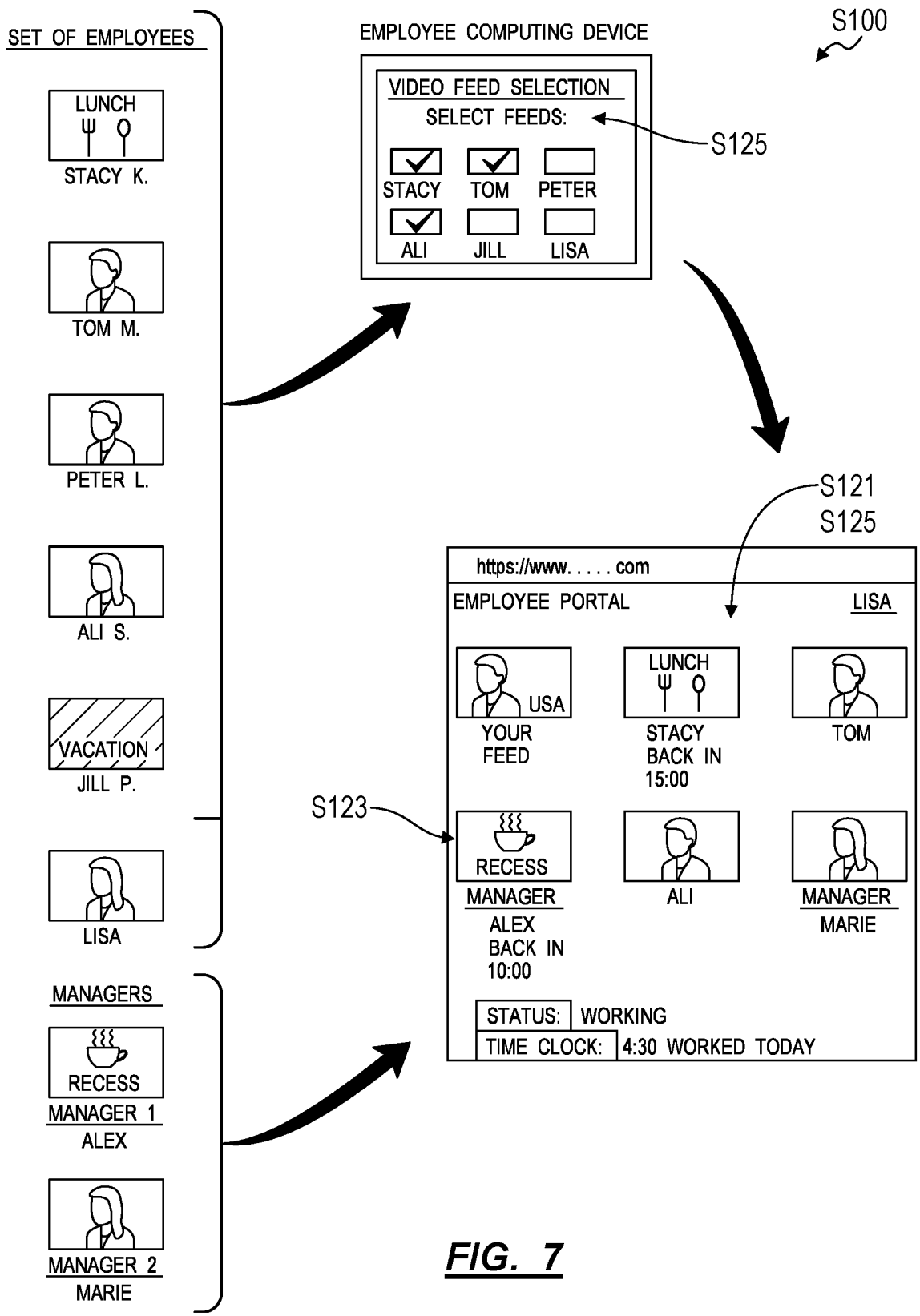
FIG. 7 is a flowchart representation of the method.

As shown in FIGS. 4, 6, and 7, the method S100 includes: distributing a first subset of employee video feeds to a first instance of the employee portal executing on a first employee computing device associated with a first employee, the first subset of employee video feeds comprising a second employee video feed of a second employee and a third employee video feed of a third employee in Block S121; distributing a second subset of employee video feeds to a second instance of the employee portal executing on a second employee computing device associated with a second employee, the second subset of employee video feeds comprising a first employee video feed of the first employee and the third employee video feed of the third employee in Block S122; distributing the manager video feed to the first instance of the employee portal and the second instance of the employee portal in Block S123; and distributing the set of employee video feeds to the instance of the manager portal in Block S124. Generally, in Block S121, the computer system distributes video feeds of a group of employees—collected in Blocks S112 and S114—to employee portals of employees within the group and to a manager portal of a manager of the group and distributes video feeds of a manager to employee portals.

A manager and an employee may thus view video feeds of multiple other employees through corresponding manager and employee portals. For example, by supplying real-time video feeds of employees to a manager through a manager portal, the computer system can enable the manager to quickly visually identify and address: employees who need guidance; employees who are focused and productive; and employees who are misusing or abusing company resources, such as by double-shifting by simultaneously working remotely for another company. In this example, by similarly supplying real-time video feeds of an employee to other employees within a company or within a group, the computer system can enable these employees to: develop visual relationships with remote coworkers; compare productivity and work styles within the group; and identify employees who need guidance, praise, or correction; all of which may improve accountability within the group.

The computer system can execute Blocks S121, S122, and S123 of the method S100 to distribute a subset of employee video feeds and a manager video feed (or multiple manager feeds) to an instance of the employee portal associated with a first computing device of a first employee. Generally, the computer system can distribute subsets of employee video feeds, selected by or for the employee from the set of employee video feeds, and a manager video feed to be rendered in instances of the employee portal executed on employee computing devices. The computer system can distribute distinct subsets of employee video feeds to distinct instances of the employee portal. As described below, the computer system can distribute a first subset of employee video feeds to a first instance of the employee portal and a second subset of employee video feeds—either distinct from or overlapping with the first subset of employees video fees—to a second instance of the employee portal.

Similarly, the computer system can execute Block S124 of the method S100 to distribute the set of employee video feeds (e.g., a set of video feeds of employees within a team managed by a manager) to an instance of the manager portal associated with a computing device of the manager.

The computer system can render instances of the employee portal and instances of a manager portal in a web browser or through a dedicated application executing on an Internet-connected computing device (e.g., a desktop computer, a laptop computer, a smartphone, or a tablet computer).

The computer system can also interface with an employee monitoring system, work flow system, electronic time sheet, or other system executing on an employee's computing device to collect keystroke, cursor motion, production, product quality, work status, and/or other relevant employee data during work hours. For example: a keystroke and URL monitoring system, a work flow system, and an electronic time sheet can be integrated into each employee portal; an instance of the employee portal can track keystrokes, collect employee productivity data, and record work statuses selected by a corresponding employee; and the computer system can retrieve these employee work data from the employee portal while also serving video feeds of other employees to the employee portal. The computer system can then manipulate these employee data to: selectively deactivate a video feed; replace a video feed with a static image or status overlay; set and clear employee alerts; reorder or prioritize video feeds within the manager and employee portals; and/or adjust frame rates, resolutions, etc. for each employee video feed within the manager and employee portals. In this example, an instance of the employee portal can render live video feeds of other employees within a home screen, and an employee can navigate to secondary screens or windows within the employee portal to set a work status and to access personal or group metrics.

5.1 Grid Array

The computer system can render video feeds in instances of the employee portal and instances of the manager portal as a grid array spanning a window rendered on a display of a computing device. For example, the computer system can serve twelve unique video feeds of a set of twelve employees to an instance of a manager portal accessed within a browser executing on a desktop or laptop computer. In this example, the manager portal can render each of the twelve unique video feeds as twelve tiles simultaneously in a 4×3 grid array. For a particular employee within the group, the computer system can similarly serve a subset of unique video feeds of each of the other eleven employees within the set of employees to a particular instance of the employee portal executed on a computing device associated with the particular employee. The particular instance of the employee portal can similarly render each of the eleven unique (employee) video feeds as eleven tiles simultaneously in a 4×3 grid array. Additionally, the particular instance of the employee portal can render a manager video feed in a twelfth position of the 4×3 grid array.

5.2 Sidebar

As shown in FIG. 6, in Block S127 of the method S100, the computer system can also serve video feeds to instances of the employee portal and instances of the manager portal rendered in a sidebar window rendered on a display of a computing device. For example, a computing device associated with a first employee can render a first instance of the employee portal in a sidebar window docked on the right side of a screen of the first employee's computing device. The sidebar window can occupy a portion of the display (e.g., 15% of the right side of the screen) such that video feeds displayed on the screen augment productivity of employees rather than distract employees from work-related activities. In this example, the first employee's computing device can render a subset of employee video feeds and the manager video feed in the first instance of the employee portal as thumbnail frames displayed in the sidebar window. In this example, the computer system can execute instances of the employee portal, such that video feeds rendered in the instances of the employee portal function to facilitate employee work rather than distract employees from other tasks performed on an employee's computing device.

However, the computer system can render video feeds in instances of the employee portal and instances of the manager portal in any other format, pattern, or size. Additionally, instances of the employee portal and instances of the manager portal can span an entirety or a portion of a screen on which the instances of the employee portal and instances of the manager portal are rendered.

6. Employee Controls

In one implementation shown in FIGS. 4, 6, and 7, the computer system can collect a continuous video feed from a camera assigned to an employee, such as at a constant frame rate of three frames per second (3 fps) during work hours (e.g., from 9 AM to 5 PM Monday through Friday), in Blocks S112 and S114. The computer system can then serve this live employee video feed to each other employee in the employee's group (or team) and to the employee's manager during work hours. Alternatively, the computer system can selectively disable distribution of a live employee video feed to other employees within the group based on privacy options selected by the employee. For example, the computer system can enable an employee to select an option to serve a static photographic image or a virtual avatar to other employees in place of a live video feed in order to gain greater privacy from other employees in the employee's group during work hours. In this example, the computer system can preserve the manager's access to the employee's live video feed while serving only a static photographic image or virtual avatar to employee portals of other employee's within the group in order to enable the manager to continue to monitor the employee while also giving the employee a greater sense of privacy among her coworkers. The computer system can thus serve a static image or avatar to employee portals of other employees within the group, and these other employees can determine that the employee is present and working based on the presence of the image or avatar within a grid array of employee video feeds (or other arrangement of employee video feeds).

In another example, the computer system can enable an employee to select a resolution (or "blurriness") and/or a frame rate of her live video feed that is presented to her coworkers within corresponding employee portals. In this example, a camera assigned to the employee can capture a frame at a frame rate of 20 frames per second and at a resolution of 1280×720; the computer system can collect this video feed in Block S112, serve the live video feed to the manager at the original frame rate of 20 frames per second and at the original resolution of 1280×720, but serve a compressed form of the video feed—such as at a frame rate of 0.5 frame per second and/or at a resolution of 320×180 based on a share option selected by the employee from within the employee's portal—to employee portals of other employees within the group. The computer system can thus enable an employee to replace her live video feed with a static image, adjust a frame rate of her live video feed, and/or adjust a frame rate of her live video feed, etc. that is distributed to other employees within her group in order to reduce (or increase) real-time visual access that other employees may have to the employee and her actions during work hours.

In the foregoing implementation, the computer system can enable an employee to disable live video feed distribution in place of a static image or avatar at any time during a work day or restrict or limit the employee's access to such options. For example, the computer system can enable an employee to exchange a live video feed for a static image or avatar, reduce a frame rate of her live video feed, and/or reduce a resolution of her live video feed—served to other employees within her group—for up to one hour per day. In another example, the computer system can enable such privacy options for an employee who is currently or who has historically exhibited at least a threshold productivity and/or work product quality. Similarly, the computer system can enable such privacy options—for an employee—for a duration of time each day (or a fraction of each work hour, work day, work week, etc.) corresponding to the employee's productivity, work product quality, or length of employment, etc. In yet another example in which an employee is employed within a group within a company including multiple groups of employees, the computer system can distribute live employee video feeds across a set of employees, such as by serving a first live video feed of a first employee in a first group to an employee portal of a second employee in a second group within the company and vice versa; in this example, the computer system can preserve distribution of a live employee video feed to other employees within the same group but can enable the employee to select an option to serve a static image or avatar or a live video at a reduced frame rate and/or reduced a resolution, etc. to employees outside of her group. Alternatively, the manager may manually enable and disable privacy options for select employees under her supervision.

7. Manager Controls

Similarly, the computer system can collect video feeds from a camera assigned to a manager, such as at a constant frame rate in Blocks S112 and S114. The computer system can then serve this real-time manager video feed to each employee in the employee's group (or team). Alternatively, the manager may elect to disable the manager video feed through an instance of the manager portal. Thus, the computer system can selectively disable distribution of a live manager video feed to employees within the group based on privacy options selected by the manager.

Furthermore, as shown in FIG. 9, the computer system can selectively distribute (real-time) screenshare feeds of employee computing devices to an instance of the manager portal in response to selection of the screenshare feed by a manager through the instance of the manager portal. Thus, the computer system can enable a manager to opt-in to a screenshare feed of a particular employee's computing device in addition to or in lieu of a video feed of the particular employee (from a camera). In this implementation, the screenshare feed can encompass windows displayed on an employee's computing device, such as an instance of the employee portal, a web browser window, etc. The computer system can automatically disable a screenshare feed of an employee's computing device in response to detecting rendering of private information (e.g., PHI)—of the employee or of customers—on a display of the employee's computing device. Alternatively, the computer system can obscure such private information by selectively decreasing resolution of the screenshare feed or masking a portion of the screenshare feed containing the private information, in order to prevent reproduction of the private information by a person viewing the screenshare feed. However, the computer system can implement any other method or technique to selectively obscure private information from live video or screenshare feeds, such as locally at an instance of the employee portal before returning the live video or screenshare feeds to a remote server or remotely at the remote server before distributing the live video or screenshare feeds to other instances of the employee and manager portals.

The computer system can distribute a screenshare feed to instances of the manager portal in addition to or in lieu of an employee video feed. For example, a manager computing device can selectively render the screenshare feed by toggling between a screenshare feed of a particular employee and an employee video feed of the particular employee in an instance of the manager portal. In this example, at a first time, the manager computing device can render the employee video feed in a frame displayed inside the instance of the manager portal proximal a top of a screen of the manager computing device. At a second time succeeding the first time, the manager computing device can render the screenshare feed in the (same) frame displayed in the instance of the manager portal. The manager computing device can alternate (or toggle) between rendering the screenshare feed and the employee video feed in the instance of the manager portal until a manager disables the screenshare feed through the instance of the manager portal.

In another example, the manager computing device can render a screenshare feed of a particular employee alongside an employee video feed of the particular employee in an instance of the manager portal executed on the manager computing device. In this example, the manager computing device can render the employee video feed in a first frame displayed in the instance of the manager portal proximal a top of a screen of the manager computing device and render the screenshare feed in a second frame immediately to the left of the first frame. Alternatively, at a first time, the manager computing device can render the employee video feed in a first frame displayed in the instance of the manager portal. At a second time succeeding the first time, the manager computing device can render the screenshare feed, such that the screenshare feed fills the first frame and, simultaneously, render the employee video feed in a second frame overlaid on a portion of the first frame, as shown in FIG. 9.

Alternatively, the manager computing device can replace an employee video feed of a particular employee with a screenshare feed of a particular employee in an instance of the manager portal when the screenshare feed of the employee is requested by the manager.

Furthermore, in response to detecting initiation of a recess by an employee through an instance of the employee portal, the computer system can deactivate the screenshare feed of the employee. For example, if an employee wishes to remain at her computing device during a recess (or break), the employee may use her computing device privately without surveillance of her computing device's display by a manager through a screenshare feed.

7. Employee Status

Figure 3:
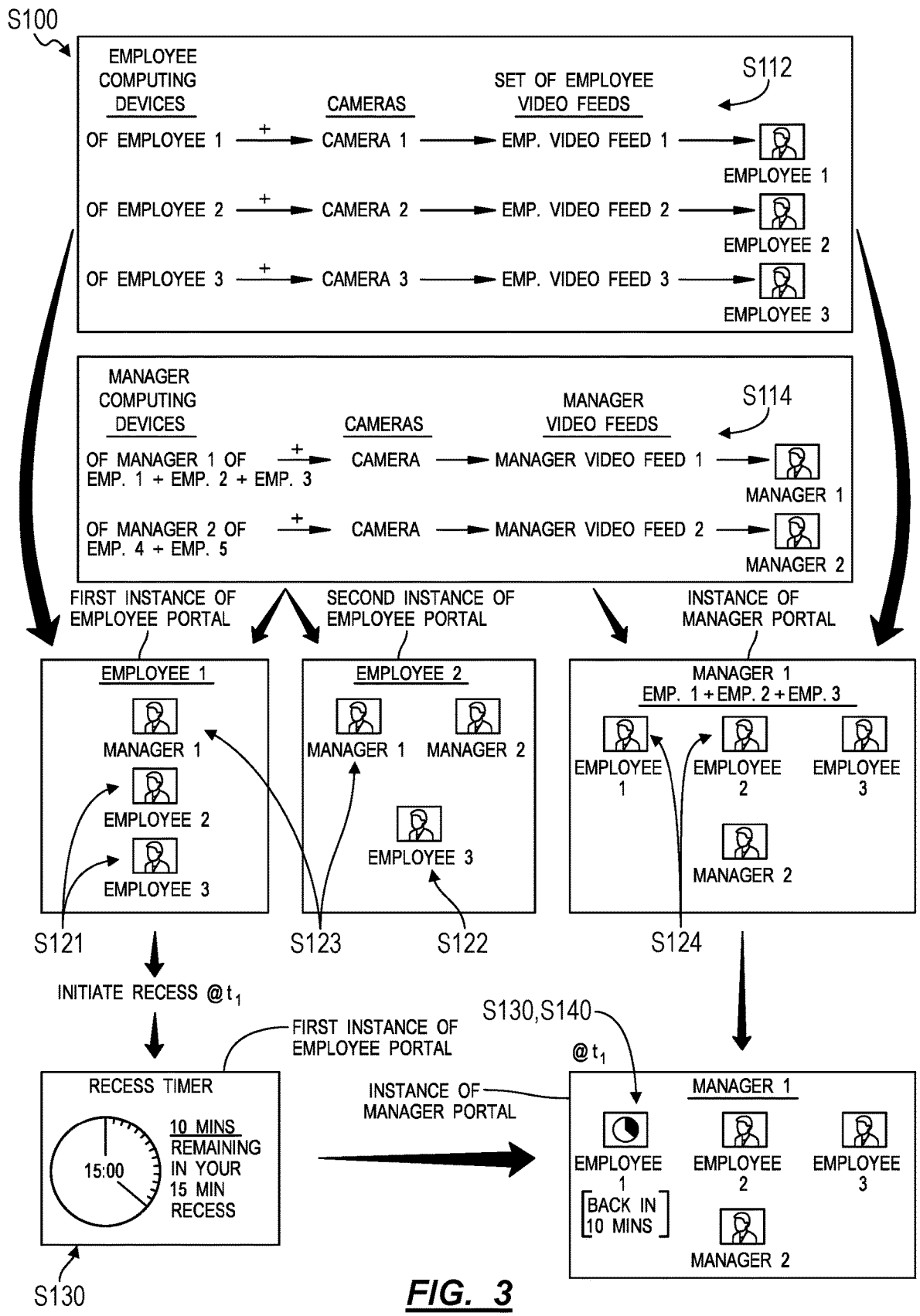
FIG. 3 is a flowchart representation of the method.

As shown in FIGS. 2, 3, and 4, Blocks S130, S140, S150, and S160 of the method S100 recite, in response to initiation of a recess for the first employee: disabling the first employee video feed of the first employee in Block S130; replacing the first employee video feed with a recess icon in the second instance of the employee portal and the instance of the manager portal in Block S140; initiating a timer for the recess based on a type of the recess in Block S150; and in response to expiration of the timer, reactivating the first employee video feed in the second instance of the employee portal and the instance of the manager portal in Block S160. Generally, the computer system receives a status update from an employee and modifies a live employee video feed that is distributed to other employees and to the employee's manager via corresponding employee and manager portals in Block S140; and the computer system again updates the employee's live video feed and alerts a manager and other employees when the employee's current status expires in Block S160.

In one implementation, each instance of the employee portal includes an electronic time sheet through which an employee may select a current status, such as pre-work, startup, working, lunch, recess or break, in-meeting, etc., to record her current status. In this implementation, the computer system can associate each status with a callout to serve a live video feed of the employee to other employees and to the employee's manager, or to disable the live video feed. For example, the computer system can serve a live employee video feed to other employees and to the employee's manager when the employee selects the "startup" and "working" statuses. However, when the employee selects the "pre-work," "lunch," "recess," and "in-meeting" statuses, the computer system can serve an avatar, icon, or other indicator of the employee' status—in place of the employee' live video feed—to other employees and to the employee's manager. For example, the computer system can replace an employee's live video feed in each other employee and manager portal with: a static break icon showing a coffee cup when the employee selects a "break" status within her employee portal; a static lunch icon showing a set of utensils when the employee selects a "lunch" status within her employee portal; and a static meeting icon showing two silhouettes and a dialog box when the employee selects an "in-meeting" status within her employee portal. The computer system can thus distribute a live employee video feed to other employee and manager portals when the employee is performing work privately for her employer for compensation, but the computer system can replace this live video feed with a status icon when the employee's status no longer corresponds to paid time (e.g., break or lunch statuses) or when the employee is actively engaging with one or more other coworkers or a manager (e.g., an in-meeting status).

In one implementation, the computer system can define a status schedule for employees in the set of employees and automatically update the employee status according to the status schedule. However, an employee or a manager may manipulate the status schedule for the employee. For example, from 8:00 am until 10:00 am, the computer system can define a working period for a particular employee. From 10:00 am until 10:15 am, the computer system can schedule a recess. However, at 9:55 am, the particular employee may begin a new task that will be incomplete at 10:00 am. In order to complete the task before initiating the recess, the employee can reschedule the recess for a different time window (i.e., 10:15 am until 10:30 am) and, thus, delay initiation of the recess.

Additionally, the computer system can reward employees for improved work quality and/or increased employee experience by increasing the employee status scheduling autonomy over time. For example, the computer system can allocate two fifteen minute recesses and a thirty-minute lunch recess during an eight-hour working period to a new employee. In this example, for the new employee, the computer system can restrict time windows during which the new employee can schedule the recesses. For example, the computer system can dictate that the employee take a first of the two fifteen-minute recesses between 10:00 am and 11:00 am and a second of the two fifteen-minute recesses between 2:00 pm and 4:00 pm. Additionally, in this example, the computer system can allocate more (e.g., three) fifteen-minute recesses and a longer (e.g., forty-five minute) lunch recess to a more experienced employee.

The computer system can additionally or alternatively apply an icon overlay over an employee's live video feed to indicate the employee's current status. For example, when two employees are in a video conference call for a scheduled remote meeting, the computer system can distribute original live feeds of the two employees to their corresponding employee portals but overlay the live video feeds of the two employees with an in-meeting icon during the video conference call, thereby enabling other employees to view the two employees while also visually indicating to the other employees that the two employees are not currently available.

Furthermore, the computer system can define status timers for preset durations corresponding to various employee statuses. For example, a manager (or other representative of the company) can define a fifteen-minute duration for a recess status through her manager portal. In this example, when an employee selects the recess status to indicate that she is now on break, the computer system can serve a break icon with a green background—in place of a live video feed of the employee—to other employee portals and to a manager portal for the employee's group and can set a fifteen-minute countdown timer. When two minutes remain on the timer, the computer system can replace the green break icon with a yellow break icon within each employee and manager portal in order to visually indicate to other employees and to the employee's manager that the employee's break is nearing an end. Furthermore, if the timer expires before the employee returns her status to working, the computer system can replace the yellow break icon with a red break icon within each employee and manager portal in order to visually indicate to other employees and to the employee's manager that the employee's break has ended but that the employee has not yet returned to work, and the computer system can return to distributing a live video feed of the employee to other employee and manager portals once the employee updates her status to working. In a similar example, the manager can define a thirty-minute duration for a lunch status through her manager portal. In this example, when an employee selects the lunch status to indicate that she is now eating lunch, the computer system can serve a lunch icon with a green background—in place of a live video feed of the employee—to other employee portals and to a manager portal for the employee's group and can set a thirty-minute timer. The computer system can: replace the green lunch icon with a yellow lunch icon within each employee and manager portal when two minutes remain on the timer; replace the yellow lunch icon with a red lunch icon within each employee and manager portal if the timer expires before the employee returns her status to working; and return to distributing a live video feed of the employee once the employee updates her status to working.

In response to initiation of a recess for a particular employee in the set of employees, the computer system can execute Block S130 to disable an employee video feed of the particular employee. In one implementation, the computer system can disable the employee video feed at a computing device of the particular employee by deactivating (e.g., shutting down) a camera coupled to the computing device. Alternatively, the computer system can disable the employee video feed in any other way, such as by disabling distribution of the employee video feed to instances of employee and manager portals.

The computer system can thus automatically switch between distributing a live video feed and one or more status icons for an employee to other employee and manager portals and can automatically update such status icons based on the status changes entered by the employee and status durations set by a manager or other company representative in order to enable both managers and employees to quickly and visually access statuses and status durations of other employees. The computer system can record status changes and status durations entered by an employee throughout a workday and can automatically populate a timecard with project codes and hours worked by the employee during a work day.

9. Alerts

Figure 5:
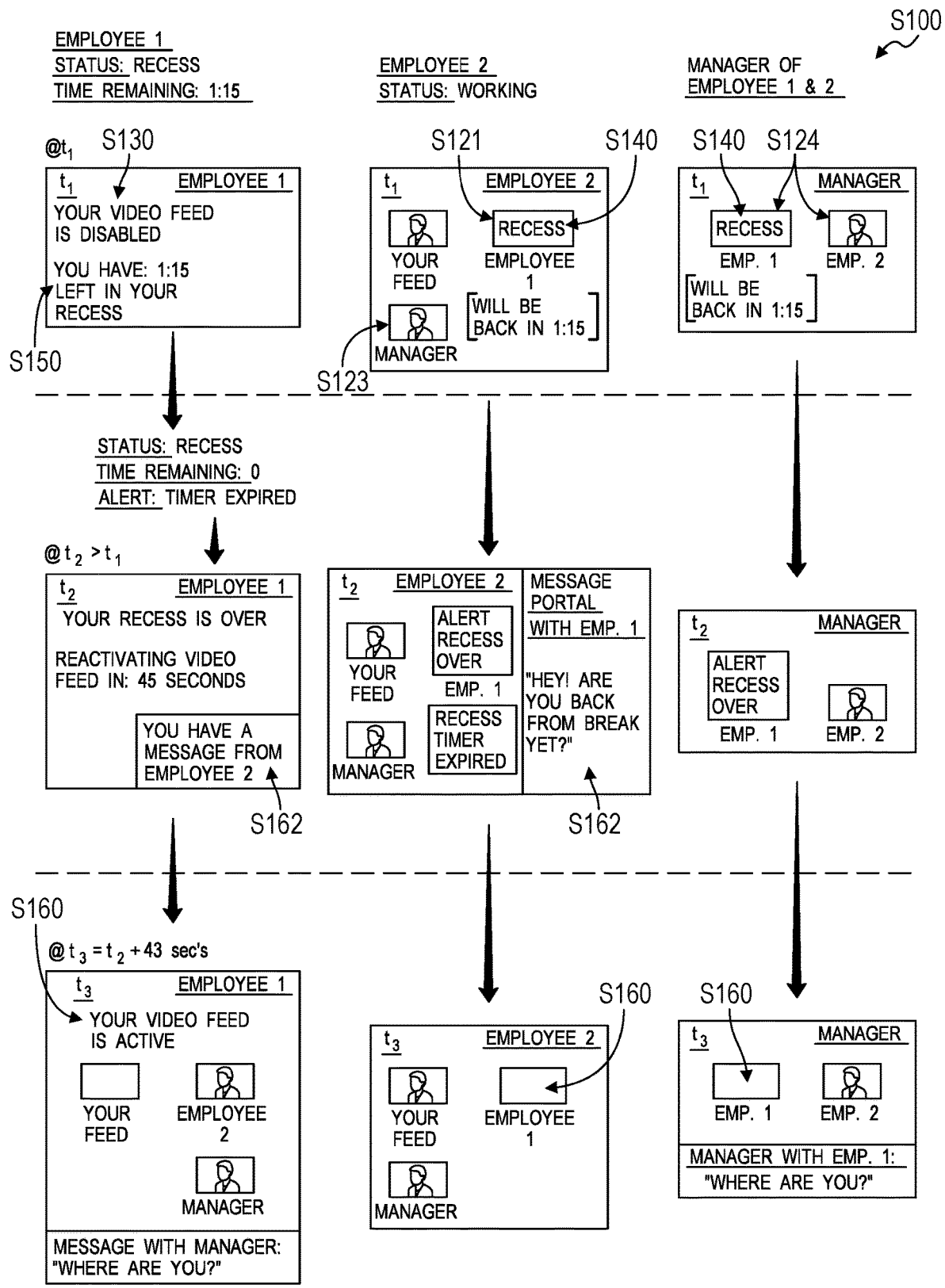
FIG. 5 is a flowchart representation of the method.

As shown in FIG. 5, the computer system can automatically and selectively serve visual alerts to a manager portal in order to prompt the manager to engage an employee under her supervision. In particular, because a manager may have attention limitations, the computer system can detect employee scenarios possibly requiring manager input—such as by interpreting actions performed by an employee and interactions between the employee and other employees—and can automatically serve an alert to the manager portal to prompt the manager to engage the employee. For example, the computer system can adjust status icon colors, such as for break and lunch status as described above, for an employee to the manager portal in order to indicate to the manager that the employee's status has or is about to expire. In another example, the computer system can interface with an external employee productivity tracking service or incorporate an integrated employee productivity modeler to track an employee's productivity and/or work product quality, and the computer system can flag the employee's video feed within the manager portal if the employee's productivity and/or work product quality drop below corresponding thresholds. In this example, the computer system can overlay the employee's live video feed with a translucent colored image or insert a colored flag in a corner of the employee's live video feed within the manager portal in order to prompt the manager to direct her attention to the employee and to provide the employee with immediate guidance. The computer system can implement similar methods and techniques to prompt the manager to engage an employee if the computer system detects no keystrokes or mouse inputs within a threshold period of time (e.g., five minutes) or if the computer system detects less than a threshold frequency of keystrokes or mouse inputs over a period of time.

The computer system can thus issue alerts or notifications through existing live employee video feeds shown within a manager portal to visually prompt a manager to direct her attention to a particular employee. The computer system can implement similar methods and techniques to distribute all or a subset of such alerts—presented within a manager portal—to employee portals in order to enable employees within a company or within a group to self-manage. For example, the computer system can serve alerts relating to status expirations (e.g., break or lunch time overages) and lack of keystrokes or mouse inputs for a particular employee to all employee and manager portals within a group in order to offload some management of the particular employee from the manager to other employees who may (relatively) quickly message the particular employee to inquire about a status expiration or a lack of perceived productivity. In this example, the computer system can also serve select alerts exclusively to the manager portal, such as alerts relating to a particular employee's work product quality.

As described above, the computer system can also source alerts from employee actions and interactions. For example, the computer system can trigger an alert to prompt the manager to engage an employee if the frequency or length of comments to inbound from other employees to a particular employee's portal exceed an historical average for the group, exceed an historical average for the employee, or exceed any other threshold. For example, because the computer system distributes live video feeds among employees during work periods, improper arrangement of an employee's issued camera within her office or a malfunctioning camera may prompt other employees viewing the employee's live video feed to comment on the error relatively immediately; when a number or frequency of such inbound comments reaches a preset threshold, the computer system can identify the employee's live video feed as a point of interest and prompt the manager to view the employee's live video feed, such as by moving the live video feed to a top of the manager portal, overlaying a flag in a top-right corner of the live video feed, overlaying a translucent colored review icon over the live video feed, highlighting the live video feed with a colored perimeter, or expanding or enlarging the live video feed, etc.

Additionally or alternatively, as shown in FIG. 5, the computer system can distribute alerts to inform a first employee when she should return from a recess and inform other employees and managers when to expect the first employee to return from the recess. For example, a first employee may initiate a recess through a first instance of the employee portal. Thus, the computer system can initiate a recess countdown timer, deactivate an employee video feed of the first employee, and replace the employee video feed with a recess icon. Furthermore, the computer system can disable communications between other employees and the first employee to maintain the first employee's privacy during the recess. However, in Block S162, upon expiration of the recess timer, the computer system can open a line of communication (e.g., a textual messaging or other communication portal) between the first employee and other employees to enable other employees to inquire over the employee's whereabouts after expiration of the employee's recess timer. Thus, if the first employee fails to return after expiration of the recess countdown timer, other employees may contact the first employee to remind the employee to return. Thus, the computer system can implement the method S100 to facilitate inter-employee accountability.

The computer system can also implement a grace period to delay alerting other employees and a manager of an employee's failure to return after expiration of a recess timer. Thus, the computer system can allow an employee some leeway to return and reactivate her employee video feed after a recess. For example, upon expiration of the recess timer, the computer system can distribute an alert to the first employee through the first instance of the employee portal indicating that the first employee should return to her computing device. After expiration of the recess timer, the computer system can update the recess icon in other instances of the employee portal associated with other employees and the instance of the manager portal to indicate the employee has failed to return from the recess. After a grace period (e.g., five minutes) succeeding expiration of the recess timer, the computer system can reactivate the employee feed. Thus, if an employee forgets to indicate her return through the instance of the employee portal or is slightly late to return to her computing device, the employee may avoid unnecessary penalty and embarrassment from an alert sent to manager(s) and other employees.

10. Video Feed Selection

By distributing multiple live video feeds to a single instance of an employee portal for real-time display to an employee and to a single instance of a manager portal for real-time display to a manager, the computer system may impose significant data download rate requirements at computing devices executing the employee and manager portals. Furthermore, a large quantity of video feeds rendered in an instance of the employee portal can distract the employee from work-related tasks. The computer system can therefore filter, prioritize, or vary frame rates or resolutions (or "compression") of employee video feeds shown within employee and manager portals in order to accommodate bandwidth limitations at these computing devices and limit distraction of employees from their work.

7.1 Employee Video Feed Selection

In one implementation shown in FIG. 7, the computer system can distribute subsets of employees selected from a (larger) set of employees to instances of the employee portal and instances of the manager portal. In one example, in which a distributed workforce of employees within a company are arranged within groups (or teams), the computer system distributes a video feed of each employee to other employees within the same group and to the employee's manager exclusively. For example, rather than upload 100 live video feeds to each of 100 employee portals for the 100 employees within a company, the computer system can distribute a first set of ten live video feeds from a first set of employees to employee portals for the first group and to a manager of the first group, distribute a second set of ten live video feeds from a second set of employees to employee portals for the second group and to a manager of the second group, etc., thereby decreasing total data download rates at each employee's computing device and increasing intragroup employee-to-employee face time through their employee portals. However, for a set of employees that includes fewer than a threshold number of employees (or if an employee's computing device can support greater download bandwidths), the computer system can tile live video feeds from each other employee in the employee's group as well as a subset of live video feeds of employees in one or more other groups in the employee's portal. For example, within an employee's portal, the computer system can cycle through video feeds of employees outside the employee's group in order to introduce the employee to other employees of the company over time.

In another implementation shown in FIG. 7, the computer system can select a subset of employee video feeds from the set of employee video feeds (e.g., employees within a team) to distribute to instances of the employee portal. Additionally or alternatively, in Block S125, an employee may select employee video feeds from the set of employee video feeds for the computer system to distribute to the employee's instance of the employee portal. For example, during a working period for a first employee, the computer system can select a first subset of employee video feeds to distribute to a first instance of the employee portal rendered on the first employee's computing device. However, after initiation of a recess, the first employee may select a second subset of employee video feeds, distinct from the first subset of employee feeds, for the computer system to distribute to the first instance of the employee portal during the first employee's recess. Additionally, the first employee may elect to share her video feed with employees in the second subset of employees during the first employee's recess. Thus, in this example, the first employee can elect to share a video feed of the first employee's recess with select coworkers during her recess and also view video feeds of those select coworkers through the first instance of the employee portal. Generally, the computer system can implement the method S100 to enable employees to share recess periods with associates. Additionally, for employees whose video feeds are absent from the second subset of employee video feeds selected by the first employee, the computer system can distribute a static feed, employee avatar, and/or recess icon to other instances of the employee and manager portals in Block S112.

Within a group of employees, the computer system can also: (pseudorandomly) define multiple subsets of employees, wherein all employees within the group are represented at least once within the multiple subsets of employees; assign each subset of employees to the employees within the group, wherein each subset of employees is assigned to at least one employee within the group; and, for each employee within the group, serve live video feeds of employees within the subset of employees assigned to the employee to the employee's portal. In this implementation, the computer system can generate new subsets of employees, reassign existing subsets of employees to other employees within the group, and/or update selection of live video feeds served to employee portals for the group according to these new subset and/or new subset assignments. For example, the computer system can update employee subsets or employee subset assignments regularly, such as at the top of each hour of a workday, at the beginning of each workday, or at the beginning of each work week, etc., in order to expose each employee in the group to other employees within the group over time. The computer system can thus limit the number of unique video feeds served to an employee within the group via an employee portal at any one time, thereby limiting the total bandwidth necessary to serve the employee portal, while also ensuring that all employees within the group can be viewed by and interface with at least one other employee within the group at any time.

Alternatively, an employee may select video feeds to view in her instance of the employee portal during work periods. In this implementation, the computer system can receive a first selection of employee video feeds through a first instance of the employee portal. The computer system can also append (or augment) the first selection of employee video feeds with an additional employee video feed selected by the computer system (and/or the manager) to define the first subset of employee video feeds. For example, the first employee may select three employee video feeds of the first employee's three closest associates to view in the instance of the employee portal during the first employee's working period. However, the instance of the employee portal can include space for four employee video feeds and one manager video feed. Thus, the computer system can select an additional employee video feed to distribute to the instance of the employee portal. During the working period, the computer system can replace the additional employee video feed with other employee video feeds periodically, thereby cycling through employee video feeds in the set of the employee video feeds. Thus, the computer system can expose the first employee to employee video feeds of employees outside of the first employee's immediate associate group. Furthermore, for less popular employees whose employee video feeds are infrequently selected by other employees, the computer system can ensure the less popular employees' video feeds are regularly rendered in instances of the employee portal. Thus, the computer system can preserving fluidity and inclusiveness of employee cliques by preventing regular exclusion of video feeds of less popular employees from other instances of the employee portals.

In another implementation, the computer system orders video feeds of employees based on current status and current or impending expiration of status period. For example, the computer system can prioritize all expired statuses over unexpired statuses, prioritize recess statuses over lunch statuses, prioritize lunch statuses over work status, and prioritize unexpired statuses of all time statuses by time to expiration. In this example, the computer system can serve a limited number of highest-priority video feeds to the manager portal, such as including only expired status and statuses soon to expire. The computer system can implement similar methods and techniques to select a subset of video feeds of employees for whom an alert (described above) is current or projected to trigger within a threshold time (e.g., within two minutes) and the computer system can serve these select video feeds to the manager portal for real-time display for the manager.

Additionally, the computer system can receive a work quality assessment (e.g., a quarterly review survey) of a first employee from a manager of the first employee. In response to the work quality assessment exceeding a threshold quality (e.g., "A" grade or higher), the computer system can replace the first employee video feed with a static image of the first employee, such as an avatar, in instances of the employee portal in which the first employee video feed is active. Thus, the first employee may, effectively, earn increased privacy through improved work quality and the computer system can reward and recognize employees for high quality work.

In one implementation, the computer system can distribute a manager video feed of a manager of a first team of employees to instances of the employee portal associated with the first team of employees. The computer system can also distribute additional manager video feeds—of other managers of additional teams of employees distinct from the first team—to instances of the employee portal associated with the first team of employees. Thus, an employee within the first team may view video feeds of multiple managers through her instance of the employee portal. For example, the computer system can access a first manager video feed from a first manager camera coupled to a first manager computing device executing a first instance of the manager portal, the first manager video feed associated with a first manager of a first set of employees; access a second manager video feed from a second manager camera coupled to a second manager computing device executing a second instance of the manager portal, the second manager video feed associated with a second manager of a second set of employees distinct from a first set of employees; and distribute the second manager video feed, in addition to the first manager video feed, to the instances of the employee portal associated with employees in the first set of employees. In this implementation, employees in the first set of employees can access and seek help from multiple managers when the manager of the first set of employees is unsure how to help an employee, an employee feels uncomfortable approaching their manager, etc. Thus, the computer system can function to provide multiple venues for employees to seek and find assistance via the employee portal.

7.2 Manager Video Feed Selection

In the foregoing implementation, for a manager who supervises multiple groups of employees, the computer system can cycle through loading live video feeds of a first set of employees and loading live video feeds of a second group of employees to the manager portal, such as by switching from one subset of employees to a next subset of employees on a thirty-second interval. The computer system can also paginate a set of video feeds of employees within employee and manager portals. For example, the manager portal can display up to six video feeds at any time in a 2×3 grid array, and the manager portal can automatically cycle from one set of six video feeds of one subset of employees to a next set of six video feeds of a next subset of employees under the manager's supervision, such as every thirty seconds.

Alternatively, as shown in FIG. 8, the computer system can prioritize video feeds of select employees for a manager and serve only the highest-priority video feeds to the manager portal. In particular, the computer system can select a subset of live video feeds to present to the manager through the manager portal based on one or more parameters, sort this subset of live video feeds, and update the manager portal to show this sorted subset of live video feeds.

In one implementation, the computer system sorts video feeds of employees—assigned to a manager—chronologically according to most recent status changes (e.g., from a working status to a recess status or from a lunch status to a working status), and the manager portal displays a first subset of these ordered video feeds on a first page of a paginated video feed view within the manager portal; to view a second subset of these video feeds in chronological order, the manager can select a second page of video feeds within the manager portal.

As shown in FIG. 8, the computer system can also select, sort, or reorder employee video feeds based on production or work product quality of employees assigned to the manager, including assigning greatest priority to employees with current or historically lower production or historically lower work product quality. The computer system can thus present a limited subset of video feeds of employees exhibiting lower production and/or lower work product quality to the manager through the manager portal in order to provide the manager with the most immediate access to video feeds of these employees and the most immediate access to communication with these employees, such as via messaging or video conferencing, as described above.

In another implementation, the computer system orders video feeds of employees based on current status and current or impending expiration of status period. For example, the computer system can prioritize all expired statuses over unexpired statuses, prioritize recess statuses over lunch statuses, prioritize lunch statuses over work status, and prioritize unexpired statuses of all time statuses by time to expiration. In this example, the computer system can serve a limited number of highest-priority video feeds to the manager portal, such as including only expired status and statuses soon to expire. The computer system can implement similar methods and techniques to select a subset of video feeds of employees for whom an alert (described above) is current or projected to trigger within a threshold time (e.g., within two minutes) and the computer system can serve these select video feeds to the manager portal for real-time display for the manager.

In another example, the computer system can order employee video feeds rendered in the instance of the manager portal according to proximity of timer expiration. For example, the computer system can initiate a first recess of a first employee and can initiate a second recess of a second employee, wherein a second timer for the second recess expires after expiration of a first timer for the first recess. In this example, the computer system can prioritize a first video feed of the first employee in the instance of the manager portal over the second video feed of the second employee because the first employee is expected to return to her computing device before the second employee is expected to return to his computing device.

Similarly, the computer system can prioritize video feeds of employees based on current skill or training level. For example, the computer system can prioritize—within the manager portal and/or within employee portals—presentation of video feeds of employees currently in training or most recently employed by the company. In this example, the computer system can reorder a set of video feeds within the manager portal to show only a subset of live video feeds of employees supervised by the manager and hired within the past six weeks or currently operating a training module. The computer system can similarly order, prioritize, or select a subset of employee video feeds to serve to other employees within the group. In this implementation, the computer system can regularly repeat any of the foregoing methods and techniques throughout a work day to reprioritize video feeds and to reorder the video feeds within employee and manager portals, such as every thirty second or once per five-minute interval.

For example, the computer system can access an experience metric of each employee in the set of employees. The experience metric can define a number of months or years an employee has worked in the employee's current position, a number of training modules the employee has completed, a work output tier achieved by the first employee, etc. Thus, at the instance of the manager portal, the computer system can render the set of employees in an inverse order based on the experience metric, such that less experienced employees appear near a top of the instance of the manager portal and more experienced employees appear near a bottom of the instance of the manager portal.

The computer system can also order employee video feeds in an instance of the manager portal based on what an employee is currently viewing on the employee's computing device. For example, if an employee is currently viewing PHI of a customer, the computer system can deprioritize the video feed of the employee in the instance of the manager portal by moving the video feed down in the instance of the manager portal. Alternatively, the computer system can remove employee video feeds of those employees currently viewing PHI (or other private information) from the manager portal entirely. Furthermore, the computer system can disable screensharing (and employee screenshare feeds) from an employee computing device currently rendering private information. For example, in response to detecting PHI rendered on a particular employee computing device, the computer system can alert the manager through a popup confirmation window that screensharing with the particular employee is unavailable due to concurrent display of private information.

Additionally or alternatively, the computer system can order video feeds within an instance of a manager (or employee) portal based on frequency of employee video feed selection by other employees. For example, a first employee's video feed may be selected for viewing in instances of the employee portal by other employees on the first employee's team infrequently (or never). To avoid alienation of the first employee, the computer system can prioritize the first employee's video feed in the manager portal so that a manager may closely monitor behavior of the first employee and help the first employee integrate into the first team, improve camaraderie with other employees, etc.

8. Inter-Employee Communications

In one variation, the computer system further supports inter-employee and inter-manager communications through employee and manager portals. In one implementation, the computer system interfaces with a third-party service to host peer-to-peer messaging and video conferencing that employees and a manager can access within their corresponding employee and manager portals. The computer system can thus enable employees and managers to hold video conference calls within their corresponding portals, and the computer system can automatically update an employee's status and adjust the employee's video feed (e.g., by replacing the video feed with an in-meeting status) based on the employee's presence within a video conference call. In another example, for employees who elect overlapping lunch statuses, the computer system can enable these employees to selectively connect via a video conference call during a lunch period to enable these employees to remotely dine together. In this example, for two employees who elect to dine together during a lunch period, the computer system can preserve distribution of live video feeds between these two employees, enable a two-way audio connection between the two employees, and serve static lunch icons to other employees not dining remotely with the two employees during the lunch period.

In this variation, the computer system can also track a frequency of inbound and/or outbound messages at an employee portal. For example, the computer system can track a frequency of inbound messages at an employee portal (i.e., a number of messages sent to an employee by other employees within a period of time) over time and trigger an alert or prompt manager oversight if a current inbound message frequency exceeds an historical average inbound message frequency for the employee, such as described below.

11. Video Feed Compression

In another implementation, the computer system compresses an employee's video feed in order to reduce bandwidth requirements at employee and manager computing devices executing the employee and manager portals. Uploading and downloading uncompressed video feeds can maximize bandwidth speeds and thresholds of an employee's home wireless network. By compressing employee and manager video feeds distributed by the computer system, the computer system can reduce bandwidth loads and reduce bandwidth costs to the employee.

For example, within the manager and employee portals, the computer system can specify reduced frame rates for video feeds of employees currently exhibiting high productivity and/or high work product quality but can set greater frame rates for video feeds of new employees, employees in training modules, and/or employees exhibiting lower current productivity or lower current work product quality.

As described above, the computer system can define a maximum resolution of a video feed, a subset of video feeds, or all video feeds in the set of video feeds. For example, the computer system can define a maximum resolution of an employee video feed such that the maximum resolution is sufficient for a manager to detect employee activity from the feed but insufficient to replicate textual information rendered on computing devices and captured by employee video feeds and/or the manager video feed. In this example, the computer system can define a maximum resolution of a first employee video feed at 38 pixels per inch. By capping a maximum resolution of a video feed distributed by the computer system, the computer system can reduce distribution bandwidth (i.e., for uploading and downloading video feeds) by capping the volume of data distributed over the computer network of the distributed workforce. Alternatively, a manager or employee may specify a maximum resolution of a video feed to locally limit bandwidth load for uploading and downloading video feeds to local instances of employee and manager portals.

Additionally, the computer system can specify (and cap) video frame rates of employee and manager video feeds in order to reduce data distributed over the computer network of the distributed workforce. For example, the computer system (or an employee or manager computing device) can capture a first employee video feed at a first frame rate (e.g., 10 frames per second) and upload the first employee video feed from a first employee computing device to a remote network at the first frame rate. The computer system can distribute the first employee video feed to a second instance of the employee portal executed at a second employee computing device remote from the first employee computing device. The second employee computing device can download and render the first employee video feed in a second instance of the employee portal at a second frame rate (e.g., 4 frames per second) less than the first frame rate. Additionally, the computer system can distribute the first employee video feed to an instance of the manager portal executed at a manager computing device. The manager computing device can download and render the first employee video feed at a third frame rate (e.g., 6 frames per second) less than the first frame rate and greater than the second frame rate. For example, when the first employee is viewing PHI on the first employee's computing device, the computer system can: serve the first employee video feed at a low frame rate to the second instance of the employee portal in order to prevent the second employee from visually accessing these PHI; and serve the first employee video feed at a higher frame rate to the instance of the manager portal in order to enable the manager to monitor and confirm appropriate use of the PHI by the first employee.

By rendering employee video feeds at the instance of the manager portal at a higher frame rate than a frame rate of employee video feeds rendered in instances of the employee portal, the computer system can enable a manager to visualize employee activity more clearly than employees can visualize activity of fellow employees. Additionally, the computer system can distribute video feeds at various frame rates to reduce data transmitted across the computer network and minimize bandwidth loads locally and globally.

The computer system can also selectively and dynamically alter resolution of video feeds to periodically improve clarity of video feeds distributed to instances of the employee and manager portals. For example, the computer system can access a first employee video feed recorded at a first resolution at the first employee computing device and distribute the first employee video feed at the first resolution to a second instance of the employee portal executed at a second computing device. In response to activation of an audio channel between the first computing device and the second computing device, the computer system can trigger the first employee computing device to return the first employee video feed at a second resolution greater than the first resolution and distribute the first employee video feed at the second resolution to the second instance of the employee portal. Thus, as a first employee behind the first computing device and a second employee behind the second computing device talk to each other, resolution of video feeds between them increase, thereby improving clarity of video feeds and improving a sensation of real time and space conversation between employees over the computer network. Furthermore, in the absence of a conversation between the first employee and second employee through the first and second instance of the employee portal, the computer system can reduce video feed data distributed across the computer network by triggering the first employee computing device to return the first employee video feed at the first resolution; and distributing the first employee video feed at the first resolution to the second instance of the employee portal.

In this implementation, the computer system can classify an employee based on a perceived need for interaction with other employees or for supervision by a manager, and the computer system can set a frame rate for the employee's video feed in the manager portal and/or in employee portals of other employees in the employee's group. For example, the computer system can: implement a low frame rate (e.g., one frame per minute) and a high frame rate (e.g., three frames per second); assign either the low frame rate or high frame rate to the employee based on her current classification; and serve these frames to the employee's manager via the manager portal at the assigned frame rate in order to limit a data download rate at the manager's station.

In another example, the computer system implements a range of frame rates for video feeds served to the manager portal (e.g., from three frames per second to one frame per minute) and implements a parametric model to calculate a frame rate over which to serve a video feed of a particular employee based on the particular employee's current or historic production rate or work product quality, time employed, training status, difficulty of a current or assigned project, and/or a current status of a status timer, a frequency of messages inbound to the particular employee, etc. The computer system can thus assign various frame rates to video feeds of employees under the supervision of a particular manager based on one or more qualitative or quantitative parameters in order to limit a total data download rate at the manager's station when video feeds of multiple employees are served to the manager portal. In the foregoing examples, the computer system can also prompt the employee's camera to collect and upload frames at the assigned frame rate in order to limit a data upload rate at the employee's station.

The computer system can select (or calculate) and assign a new frame rate to each employee under a manager's supervision substantially in real-time, such as in response to a change in productivity or a change in work product quality or in response to change in any other one or more tracked parameters, as described above. The computer system can also increase a frame rate of an employee's video feed (e.g., such as from one frame per minute to three frames per second) within the manager portal automatically and in real-time in response to a mouse-over event in which the manager moves a cursor or other pointer over the employee's video feed. The computer system can similarly increase the frame rate of an employee's video feed within the manager portal while the manager and employee are communicating directly within the computer system, such as via text, audio, or audio/visual communications described above. The computer system can additionally or alternatively replace an employee video feed with a static image or reduce the resolution of frames of an employee's video feed served to the manager portal in order—such as for an employee exhibiting a greatest current or historical production and/or greatest work product quality within her group, as described above—in order to reduce a total download data rate at the manager portal.

In this implementation, the computer system can also set or implement a data download rate cap for the manager portal and dynamically: adjust a total number of employee video feeds shown within the manager portal; adjust a frame rate for each video feed shown in the manager portal; replace video feeds with static images or static overlays; and/or adjust video feed frame resolution; etc. in order to achieve a total data download rate less than the data download rate cap for the manager portal.

In another implementation, the computer system can detect changes in pixels between frames of a video feed and selectively distribute changed pixels (exclusively) in place of a full video feed to instances of the employee and manager portals. For example, an employee video feed can capture a portion of an employee's home office including a wall, a chair, a desk, a monitor, and the employee. From a first frame to a second frame, pixels depicting the wall, the desk, and a portion of the monitor remain the same while pixels depicting the desk, content rendered on the monitor, and the employee change. Rather than distributing the (full) first frame and the (full) second frame in real-time to instances of the employee and manager portals, the computer system can: at a first time, distribute the first frame to instances of the employee and manager portals; at a second time, detect a subset of pixels of the first frame that have changed between the first time and the second time; distribute the first subset of pixels of the first frame to instances of the employee and manager portal; and, at approximately the second time, update the first subset of pixels within the first frame. Thus, the computer system can reduce total volume of transmitted data within the computer system by (exclusively) transferring changing portions of frames within a video feed recorded at one computing device to instances of the employee and manager portals.

However, the computer system can implement any other method or technique to filter, prioritize, or compress employee video feeds served to a manager through the manager portal. The computer system can implement similar methods and techniques to reduce a total data download rate within an employee portal.

12. Employee Data

In one variation, the computer system aggregates production data of an employee and presents these data to the manager through the manager portal. For example, the computer system can collect productivity (e.g., production rate), product quality, time worked today, time worked this week, location, time zone, breaks completed, work group, training milestones, and/or other production data of an employee over time and then present these data in a popup window within the manager portal when the manager moves a cursor over the employee's live video feed (e.g., a "video feed mouse-over event"). In this example, the computer system can thus enable the manager to access an employee's metrics through the employee's live video feed.

In this implementation, the computer system can similarly present an employee's production data to other employees within the company. For example, the computer system can provide a full set of employee production data to the manager in response to a video feed mouse-over event within the manager portal but can provide only a limited subset of these production data—such as sans private or personal information—to another employee in response to a video feed mouse-over event within an employee portal. The computer system can thus improve inter-employee transparency within a group or within a company by enabling employees to quickly access production data of themselves and other employees and to understand their production relative to production of other employees within the same group or within the company.

The computing computer system can also enable a manager or another employee to view a video feed and/or a work screen of a particular employee, such as if the particular employee is new to the company, is engaging in a training module, has requested help, or is exhibiting reduced productively or work product quality. The computer system can thus enable the manager or other employee to visually interface with the particular employee through her video feed and to view the particular employee's work process in real-time though the particular employee may be remote from the manager or other employee.

However, the computer system can present such employee production data in any other way or in response to any other input within an employee or manager portal. The computer system can implement methods and techniques similar to those described above to serve live video feeds and/or employee production data to a client representative through an instance of the client portal.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:
accessing a set of user video feeds from a set of user computing devices executing instances of a user portal;
accessing a director video feed from a director computing device executing an instance of a director portal;
distributing a first subset of user video feeds, in the set of user video feeds, to a first instance of the user portal executing on a first user computing device associated with a first user, the first subset of user video feeds comprising a second user video feed recorded at a second user computing device and a third user video feed recorded at a third user computing device;
distributing a second subset of user video feeds, in the set of user video feeds, to a second instance of the user portal executing on a second user computing device associated with a second user, the second subset of user video feeds comprising a first user video feed recorded at the first user computing device and the third user video feed;
distributing the director video feed to the first instance of the user portal and the second instance of the user portal;
distributing a third subset of user video feeds to the instance of the director portal;
in response to initiation of an event associated with the first user:
  disabling the first user video feed at the first user computing device;
  replacing the first user video feed with an event icon in the second instance of the user portal at the second user computing device and in the instance of the director portal at the director computing device;
  initiating a timer for the event; and
in response to expiration of the event, reactivating the first user video feed in the second instance of the user portal and the instance of the director portal.

2. The method of claim 1:
further comprising, for each user in the set of users:
  accessing an experience metric representing a duration of participation and training magnitude of the user; and
  defining a ranking for a user video feed inversely proportional to the experience metric of the user; and
wherein distributing the third subset of user video feeds to the instance of the director portal comprises:
  selecting the third subset of video feeds, associated with highest rankings, from the set of video feeds; and
  distributing the third subset of video feeds to the director portal in order of ranking.

3. The method of claim 1, further comprising:
receiving a first selection of user video feeds, from the set of user video feeds, at the first instance of the user portal, the first selection of user video feeds comprising the first subset of user video feeds;
distributing the first selection of user video feeds at a first frame rate;
distributing the director video feed at a second frame rate greater than the first frame rate;
in response to receiving a second selection of user video feeds, from the set of user video feeds, at the first instance of the user portal:
  distributing the second selection of user video feeds at the first frame rate to the first instance of the user portal for rendering adjacent the first selection of user video feeds; and
  distributing the first selection of user video feeds at a third frame rate less than the first frame rate to the first instance of the user portal for rendering adjacent the second selection of user video feeds.

4. The method of claim 1:
further comprising, in response to the director confirming achievement of a target by the first user, increasing a privacy level assigned to the first user; and
wherein disabling the first user video feed of the first user comprises disabling the first user video feed of the first user in response to the privacy level assigned to the first user exceeding a threshold privacy.

5. The method of claim 1:
wherein accessing the set of user video feeds from the set of computing devices comprises accessing the first user video feed recorded by a first camera coupled to the first user computing device associated with the first user, the first user comprising a first participant;
wherein accessing the director video feed comprises accessing the director video feed recorded by a camera coupled to the director computing device associated with the director, the director comprising an instructor;
wherein distributing the first subset of user video feeds comprises distributing the first subset of user video feeds of a subset of participants accessing the user portal; and
wherein disabling the first user video feed of the first user comprises disabling the first user video feed in response to initiation of the event comprising a scheduled recess.

6. A method comprising:
accessing a set of user video feeds from a set of user computing devices executing instances of a user portal;
accessing a director video feed from a director computing device executing an instance of a director portal;
distributing a first subset of user video feeds to a first instance of the user portal executing on a first user computing device associated with a first user, the first subset of user video feeds comprising a second user video feed of a second user recorded at a second user computing device and a third user video feed of a third user recorded at a third user computing device;
distributing the director video feed to instances of the user portal executing on the set of user computing devices;
distributing the set of user video feeds to the instance of the director portal executing on the director computing device;
in response to initiation of an event for the second user:
  disabling the second user video feed of the second user at the second user computing device; and
  replacing the second user video feed with an event icon in the first instance of the user portal executing on the first user computing device and the instance of the director portal executing on the director computing device; and
in response to termination of the event for the second user, reactivating the second user video feed in the first instance of the user portal and the instance of the director portal.

7. The method of claim 6:
further comprising, in response to the director confirming achievement of a target by the first user, increasing a privacy level assigned to the first user; and
wherein disabling the first user video feed of the first user comprises disabling the first user video feed of the first user in response to the privacy level assigned to the first user exceeding a threshold privacy.

8. The method of claim 6, further comprising distributing a second subset of user video feeds to a second instance of the user portal executing on a second user computing device associated with a second user, the second subset of user video feeds comprising a first user video feed of the first user and the third user video feed of the third user.

9. The method of claim of 6:
further comprising:
  in response to initiation of the event for the second user, initiating a first event timer for the event for an event duration based on a type of the event;
  in response to expiration of the first event timer:
    serving a first alert to the second user to reactivate the second user video feed; and
    initiating a second delay timer for a second delay duration;

at a second time, in response to expiration of a second delay timer prior to reactivation of the second user video feed:
a second alert indicating absence of the second user to the first instance of the user portal at the first user computing device; and
initiating a third delay timer for a third delay duration;
at a third time, in response to expiration of the third delay timer prior to reactivation of the second user video feed, serving a third alert indicating absence of the second user to the instance of the director portal at the director computing device; and
wherein reactivating the second user video feed in the first instance of the user portal and the instance of the director portal comprises reactivating the second user video feed in the first instance of the user portal and the instance of the director portal in response to termination of the event for the second user and receipt of confirmation from the second user to resume video recording at the second user computing device.

10. The method of claim 6, wherein disabling the second user video feed of the second user in response to initiation of the event for the second user comprises disabling the second user video feed in response to initiation of the event comprising a recess scheduled by the director.

11. The method of claim 6:
wherein accessing the set of user video feeds comprises accessing the set of user video feeds from a set of cameras, each camera in the set of cameras coupled to a user computing device associated with a user, in a set of users, comprising an employee; and
wherein accessing the director video feed comprises accessing the director video feed from a director camera coupled to the director computing device associated with the director comprising a manager of the set of users.

12. A method comprising:
accessing a set of user video feeds from a set of user computing devices executing instances of a user portal;
accessing a director video feed from a director computing device executing an instance of a director portal;
distributing a first subset of user video feeds to a first instance of the user portal executing on a first user computing device associated with a first user, the first subset of user video feeds comprising a second user video feed of a second user recorded at a second user computing device and a third user video feed of a third user recorded at a third user computing device;
distributing the director video feed to instances of the user portal executing on the set of user computing devices;
distributing the set of user video feeds to the instance of the director portal executing on the director computing device; and
for each user in the set of users:
recording a set of keystrokes executed at a user computing device, in the set of computing devices, associated with the user;
recording a set of work statuses selected by the user at the user computing device; and
calculating a set of employee productivity metrics based on the set of keystrokes executed and the set of work statuses selected over a set duration; and
in response to the employee productivity metric for the user in the set of users exceeding a threshold user productivity metric, replacing the user video feed for the user in the set of users with a static image.

13. The method of claim 12:
wherein calculating a set of employee productivity metrics comprises:
at a first time, calculating a first productivity metric of the second user over a first duration;
at a second time, calculating a second productivity metric of the second user over a second duration; and
further comprising: in response to the first productivity metric falling below the second productivity metric, decreasing a frame rate of the second user video feed of the second user.

14. A method comprising:
accessing a set of user video feeds from a set of user computing devices executing instances of a user portal;
accessing a director video feed from a director computing device executing an instance of a director portal; and
during a session:
distributing a first subset of user video feeds to a first instance of the user portal executing on a first user computing device associated with a first user, the first subset of user video feeds comprising a second user video feed of a second user recorded at a second user computing device and a third user video feed of a third user recorded at a third user computing device;
distributing the director video feed to instances of the user portal executing on the set of user computing devices;
distributing the set of user video feeds to the instance of the director portal executing on the director computing device;
receiving a second selection of user video feeds, from the set of user video feeds, at the first instance of the user portal; and
in response to receiving the second selection of user video feeds, distributing a second selection of user video feeds to the first instance of the user portal for rendering adjacent the first subset of user video feeds.

15. The method of claim 14:
wherein distributing the first subset of user video feeds comprises distributing the first subset of user video feeds, at a first frame rate, to the first user computing device; and
wherein distributing the second selection of user video feeds to the first instance of the user portal comprises:
distributing the second selection of user video feeds, at the first frame rate greater than the first frame rate, to the first user computing device; and
distributing the first video feed to the second instance of the user portal for rendering adjacent the second selection of user video feeds at a second frame rate, the second frame rate less than the first frame rate.

16. A method comprising:
accessing a set of user video feeds from a set of user computing devices executing instances of a user portal;
accessing a director video feed from a director computing device executing an instance of a director portal;
accessing a first user video feed, characterized by a first frame rate, from the first user computing device;
distributing a first subset of user video feeds to a first instance of the user portal executing on a first user computing device associated with a first user, the first subset of user video feeds comprising a second user video feed of a second user recorded at a second user computing device and a third user video feed of a third user recorded at a third user computing device;

distributing the first user video feed to a second instance of the user portal executing on the second user computing device at a second frame rate less than the first frame rate;

distributing the director video feed to instances of the user portal executing on the set of user computing devices at a third frame rate less than the first frame rate and greater than the second frame rate; and distributing the set of user video feeds to the instance of the director portal executing on the director computing device.

17. A method comprising:

accessing a set of user video feeds from a set of user computing devices executing instances of a user portal;

accessing a director video feed from a director computing device executing an instance of a director portal;

during a session:

receiving a first selection of user video feeds, from the set of user video feeds, by a first user at a first instance of the user portal;

appending an additional user video feed, in the set of user video feeds and distinct from the first selection of user video feeds, to the first selection of user video feeds to define a first subset of user video feeds; and distributing the first subset of user video feeds to the first instance of the user portal executing on a first user computing device associated with the first user, the first subset of user video feeds comprising a second user video feed of a second user recorded at a second user computing device and a third user video feed of a third user recorded at a third user computing device;

distributing the director video feed to instances of the user portal executing on the set of user computing devices; and distributing the set of user video feeds to the instance of the director portal executing on the director computing device.

18. A method comprising:

accessing a set of user video feeds from a set of user computing devices executing instances of a user portal;

accessing a director video feed from a director computing device executing an instance of a director portal;

distributing a first subset of user video feeds to a first instance of the user portal executing on a first user computing device associated with a first user, the first subset of user video feeds comprising a second user video feed of a second user recorded at a second user computing device and a third user video feed of a third user recorded at a third user computing device;

distributing the director video feed to instances of the user portal executing on the set of user computing devices;

distributing the set of user video feeds to the instance of the director portal executing on the director computing device;

receiving a quality assessment of the second user from the director; and in response to the quality assessment exceeding a threshold quality, replacing the second user video feed with a static image of the second user in the first subset of user video feeds distributed to the first instance of the user portal at the first computing device.

19. A method comprising:

accessing a set of user video feeds from a set of user computing devices executing instances of a user portal;

accessing a director video feed from a director computing device executing an instance of a director portal;

distributing a first subset of user video feeds to a first instance of the user portal executing on a first user computing device associated with a first user, the first subset of user video feeds comprising a second user video feed of a second user recorded at a second user computing device and a third user video feed of a third user recorded at a third user computing device;

distributing the director video feed to instances of the user portal executing on the set of user computing devices;

distributing the set of user video feeds to the instance of the director portal executing on the director computing device; and in response to receiving a first alert from the instance of the director portal;

receiving a first selection of the first user video feed from the instance of the director portal; and serving the first alert to the first instance of the user portal, the first alert distinct from the first subset of user video feeds and rendered within a viewing window of the first computing device.

* * * * *